(12) United States Patent
McDaniel et al.

(10) Patent No.: US 11,435,485 B2
(45) Date of Patent: Sep. 6, 2022

(54) MULTI-INERTIAL MEASUREMENT UNIT FUSION FOR FINE-RESOLUTION POSITION ESTIMATION

(71) Applicant: The Board of Regents of the University of Oklahoma, Norman, OK (US)

(72) Inventors: Jay W. McDaniel, Norman, OK (US); Mark B. Yeary, Norman, OK (US); Hjalti H. Sigmarsson, Norman, OK (US); Brian M. Sun, Oklahoma City, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 17/437,389

(22) PCT Filed: May 14, 2021

(86) PCT No.: PCT/US2021/032542
§ 371 (c)(1),
(2) Date: Sep. 8, 2021

(87) PCT Pub. No.: WO2021/236454
PCT Pub. Date: Nov. 25, 2021

(65) Prior Publication Data
US 2022/0179102 A1 Jun. 9, 2022

Related U.S. Application Data

(60) Provisional application No. 63/029,245, filed on May 22, 2020.

(51) Int. Cl.
*G01S 19/47* (2010.01)

(52) U.S. Cl.
CPC .................................. *G01S 19/47* (2013.01)

(58) Field of Classification Search
CPC ........................................................ G01S 19/47
See application file for complete search history.

(56) References Cited

U.S. PATENT DOCUMENTS

| 8,412,456 B2 | 4/2013 | Roh |
| 8,860,609 B2 | 10/2014 | Roh |

(Continued)

FOREIGN PATENT DOCUMENTS

| WO | 2014149044 A1 | 9/2014 | |
| WO | WO-2016042545 A1 * | 3/2016 | ............. G01S 19/47 |

OTHER PUBLICATIONS

H. Carvalho et al., Optimal Nonlinear Filtering in GPS/INS Integration, IEEE Transactions on Aerospace and Electronic Systems, vol. 33(3), p. 835-850, Jul. 1997 (Year: 1997).*

(Continued)

*Primary Examiner* — Bernarr E Gregory
*Assistant Examiner* — Fred H Mull
(74) *Attorney, Agent, or Firm* — Conley Rose, P.C.; Grant Rodolph; Jonathan K. Polk

(57) ABSTRACT

A method comprises: obtaining a GPS measurement; obtaining a first IMU measurement; obtaining a second IMU measurement; applying a first particle filter to the GPS measurement and the first IMU measurement to obtain a first position solution; applying a second particle filter to the GPS measurement and the second IMU measurement to obtain a second position solution; calculating a first sensor weight of the first position solution based on a likelihood function; calculating a second sensor weight of the second position solution based on the likelihood function; resampling the first position solution based on the first sensor weight to obtain a first resampled position solution; resampling the (Continued)

second position solution based on the second sensor weight to obtain a second resampled position solution; and calculating a final position estimate based on the GPS measurement, the first resampled position solution, and the second resampled position solution.

20 Claims, 15 Drawing Sheets

(56) References Cited

U.S. PATENT DOCUMENTS

| | | | |
|---|---|---|---|
| 2005/0267677 | A1 | 12/2005 | Poykko et al. |
| 2007/0118286 | A1* | 5/2007 | Wang ............... G01S 19/26 342/357.65 |
| 2010/0283832 | A1 | 11/2010 | Lin |
| 2011/0257927 | A1 | 10/2011 | Bharadwaj et al. |
| 2015/0348409 | A1 | 12/2015 | Lykkja et al. |
| 2021/0278549 | A1* | 9/2021 | Kassas ............... G01S 19/48 |
| 2021/0318449 | A1* | 10/2021 | Rollet ............... G01S 19/48 |

OTHER PUBLICATIONS

Arulampalam M., et al., "A Tutorial on Particle Filters for Online Nonlinear/non-Gaussian Bayesian Tracking". In: IEEE Transactions on Signal Processing 50.2 (2002), pp. 174-188.

Aydogmus O., et al., "Comparison of ExtendedKalman and Particle-Filter-Based Sensorless Speed Control". In: IEEE Transactions on Instrumentation and Measurement 61.2 (2011), pp. 402-410.

Boucher C. et al., "A Hybrid Particle Approach for GNSS Applications with Partial GPS Outages". In: IEEE Transactions on Instrumentation and Measurement 59.3 (2009), pp. 498-505.

D'Arco M., et al., "An Online Quality Control System for GPS Stations used for Geodetic Surveillance". In: 2012 IEEE International Instrumentation and Measurement Technology Conference Proceedings. IEEE. 2012, pp. 507-511.

Daponte P., et al., "A Method for Real-time Compensation of Magnetometers Embedded on Smartphones". In: 2016 IEEE International Instrumentation and Measurement Technology Conference Proceedings. IEEE. 2016, pp. 1-6.

Del Moral P., et al., "Sequential Monte Carlo Samplers". In: Journal of the Royal Statistical Society: Series B (Statistical Methodology) 68.3 (2006), pp. 411-436.

Djuric P.M., et al., "Particle Filtering". In: IEEE signal processing magazine 20.5 (2003), pp. 19-38.

Doucet A., et al., "An Introduction to Sequential Monte Carlo Methods". In: Sequential Monte Carlo Methods in Practice. Springer, 2001, pp. 3-14.

Doucet A., et al., "On Sequential Monte Carlo Sampling Methods for Bayesian Filtering". In: Statistics and Computing 10.3 (2000), pp. 197-208.

Engedy I., et al., "Path Reconstruction Based on Gyroscope Bias Estimation using GPS". In: 2015 IEEE International Instrumentation and Measurement Technology Conference (I2MTC) Proceedings. IEEE. 2015, pp. 1465-1470.

Fang J., et al., "Predictive Iterated Kalman Filter for INS/GPS Integration and its Application to SAR Motion Compensation" In: IEEE Transactions on Instrumentation and Measurement 59.4 (2009), pp. 909-915.

Fourati H. "Heterogeneous Data Fusion Algorithm for Pedestrian Navigation via Foot-mounted Inertial Measurement Unit and Complementary Filter". In: IEEE Transactions on Instrumentation and Measurement 64.1 (2014), pp. 221-229.

Horton M. "Open-Source, Python-based GNSS-INS Simulation." (2018) https://medium.com/@mikehorton/open-sourcepython-based-gnss-ins-simulation-dd38d7dc729a.

Rigatos G.G.. "Particle Filtering for State Estimation in Nonlinear Industrial Systems". In: IEEE Transactions on Instrumentation and Measurement 58.11 (2009), pp. 3885-3900.

Sabatelli S., et al., "A Double-stage Kalman Filter for Orientation Tracking with an Integrated Processor in 9-D IMU". In: IEEE Transactions on Instrumentation and Measurement 62.3 (2012), pp. 590-598.

Shen J., et al., "Evaluation of Unscented Kalman Filter and Extended Kalman Filter for Radar Tracking Data Filtering". In: 2014 European Modeling Symposium. IEEE. 2014, pp. 190-194.

Skog I. et al., "A Low-cost GPS Aided Inertial' Navigation System for Vehicle Applications". In: 2005 13th European Signal Processing Conference. IEEE. 2005, pp. 1-4.

Sukkarieh S., et al., "A High Integrity IMU/GPS Navigation Loop for Autonomous Land Vehicle Applications". In: IEEE Transactions on Robotics and Automation 15.3 (1999), pp. 572-578.

Sun B., et al., "Fine Resolution Position Estimation Using Kalman Filtering". In: 2019 IEEE International Instrumentation and Measurement Technology Conference (I2MTC) (I2MTC 2019). Auckland, New Zealand, May 2019.

Tao Y., et al., "A Novel Sensing and Data Fusion System for 3-D Arm Motion Tracking in Telerehabilitation". In: IEEE Transactions on Instrumentation and Measurement 57.5 (2008), pp. 1029-1040.

Wang M. "Data Fusion of MEMs IMU/GPS Integrated System for Autonomous Land Vehicle". In: 2006 IEEE International Conference on Information Acquisition. IEEE. 2006, pp. 80-84.

Wei L., et al.,"Camera/Laser/GPS Fusion Method for Vehicle Positioning Under Extended NIS-based Sensor Validation". In: IEEE Transactions on Instrumentation and Measurement 62.11 (2013), pp. 3110-3122.

Yeary M.B., et al., "Spectral Signature Calculations and Target Tracking for Remote Sensing". In: IEEE Transactions on Instrumentation and Measurement 55.4 (2006), pp. 1430-1442.

Zhai Y., et al., "Implementing Particle Filters with Metropolis-Hastings Algorithms". In: Region 5 Conference: Annual Technical and Leadership Workshop, 2004. IEEE. 2004, pp. 149-152.

Zhai Y., et al., "Enhanced Video Surveillance Using a Multiple Model Particle Filter". In: 2007 IEEE Workshop on Signal Processing Applications for Public Security and Forensics. IEEE. 2007, pp. 1-4.

Zhai Y., et al., "Target Tracking Using a Particle Filter Based on the Projection Method". In: 2007 IEEE International Conference on Acoustics, Speech and Signal Processing—ICASSP'07. vol. 3. IEEE. 2007, pp. 111-1189-111-1192.

Zhai Y., et al., "Visual Tracking Using Sequential Importance Sampling with a State Partition Technique". In: IEEE International Conference on Image Processing 2005. vol. 3. IEEE. 2005, pp. III-876.

Zhai Y., et al., "Visual Target Tracking Using Improved and Computationally Efficient Particle Filtering". In: 2006 International Conference on Image Processing. IEEE. 2006, pp. 1757-1760.

Zhai Y., et al., "An Object-tracking Algorithm Based on Multiplemodel Particle Filtering with State Partitioning". In: IEEE Transactions on Instrumentation and Measurement 58.5 (2009), pp. 1797-1809.

Zhai Y., et al., "A New Centralized Sensor Fusion-tracking Methodology Based on Particle Filtering for Power-aware Systems" In: IEEE Transactions on Instrumentation and Measurement 57.10 (2008), pp. 2377-2387.

Wang, L., et al., "Attitude Determination Method by Fusing Single Antenna GPS and Low Cost MEMS Sensors Using Intelligent Kalman Filter Algorithm," Jul. 17, 2017, 15 pages.

Foreign Communication from a counterpart application, PCT Application No. PCT/US2021/032542 filed May 14, 2021, International Search Report and Written Opinion dated Aug. 18, 2021, 10 pages.

* cited by examiner

Algorithm 1: Implemented Algorithm.

// Initialize cloud with N number of particles

1. for *Each Sensor* do
2.     InitializeCloud(mean, variance, N)
3.     Set $N_{th}$; // Set threshold of Effective particles // For Each Sensor Measurement, Propagate the respective cloud by motion model 4. for *Each State(k)* do
5.     for *Each Sensor* do
6.         for *Each Particle* do

// $p_{k-1}$ is the previous position

7.             Propagate($p_{k-1}$, dt, SensorMeasurement)
8.             CalculateParticleWeights(cloud)
9.             NormalizeParticleWeights;

CalculateNeffective($w_k^i$)

10.            if $N_{effective} < N_{th}$ then
11.                 Resample(cloud)
12.         CalculateEstimation
13.     Calculate sensor weights
14.     Normalize sensor weights
15.     for *i=1:N* do
16.         *CombinedCloud*(i) = Draw particles from sensor proposal
17.     FinalMeasurement $p_k$ = E[*CombinedCloud*]

FIG. 11

MULTI-INERTIAL MEASUREMENT UNIT FUSION FOR FINE-RESOLUTION POSITION ESTIMATION

CROSS-REFERENCE TO RELATED APPLICATIONS

This claim priority to Int'l Patent App. No. PCT/US2021/032542 filed on May 14, 2021, which claims priority to U.S. Prov. Patent App. No. 63/029,245 filed on May 22, 2020, the entireties of which are incorporated herein by reference.

STATEMENT REGARDING FEDERALLY SPONSORED RESEARCH OR DEVELOPMENT

Not applicable.

BACKGROUND

Position, navigation, and timing solutions are required by modern systems to precisely determining their relative positions in space. Traditionally, PNT systems use GPS to determine the location of the platform. One drawback is GPS traditionally updates at low frequencies typically on the order of 50 Hz and has an accuracy of approximately 30 cm using the recently established L5 band. In addition, GPS requires open sky to obtain a signal to provide a viable position solution. GPS signal integrity can degrade significantly as the navigating body traverses different environments. The low update rate and the possibility of signal loss contribute to the main downfalls of GPS. An IMU, commonly used in conjunction with GPS, often provides data at a higher frequency typically on the order of 100 to 200 Hz. The IMU provides data that allow for the estimation of the navigating body's current position (latitude, longitude, altitude), and the faster update rate of IMU data allows for position estimates to be reported more often than GPS. The downfall is IMUs will drift or walk, and the associated errors are compounded as the position estimate is made over time. Furthermore, the position is calculated by integrating the acceleration measurements provided by the IMU, and as a result the positional error will increase at a significant rate. When paired with a GPS, the estimated measurements from the IMU are sufficient to navigate the body through a GPS-starved environment. Complex sensor systems are utilizing disparate sources of information to produce a more accurate or stable measurement. In some cases, multiple data sources can be used in conjunction to obtain a more precise position estimate. The integration of GPS sensors with multiple additional inputs is known as sensor fusion and has been used in autonomous vehicles for navigation purposes. Sensor fusion in navigation applications has been used to produce accurate positional solutions using IMU and GPS measurements. One popular method of fusing data from multiple sources includes the utilization of a Kalman filter.

The Kalman filter is a commonly chosen fusion algorithm; however, the Kalman filter is limited to linear systems with additive, white Gaussian noise. The state-space method and the state estimation rely on a state process model and an observation model. The state vector contains all relevant information required to describe the system. For example, target tracking is often formulated as a state estimation problem, and the process is also known as filtering. While the Kalman filter is most commonly used under linear conditions, some methods have been developed for nonlinear and non-Gaussian cases including the EKF, UKF, finite discrete state space (i.e., grid-based methods), and more recently the sequential Monte Carlo methods. Next, these four cases are elaborated on below because it is difficult to find an analytic expression for the PDF of the estimated states of these cases. The EKF is based on the idea of linearizing the system about certain states, then applying a Kalman filter to the linearized model. The deficiencies associated with the EKF are: firstly, large errors may result from linearization and it is nontrivial to derive the Jacobian matrices, which may result in implementation difficulties; secondly, the EKF is not applicable to non-Gaussian noise. The UKF has been reported as an alternative to the EKF. Like the EKF, the UKF is also a recursive minimum mean square error estimator; however, the UKF does not require the linearization of the nonlinear model. The UKF uses sigma points, a set of deterministically selected points propagating through the nonlinear system to represent the mean and covariance of the system. Grid-based methods that rely on fixed grid approximation suffer from dimensionality, as the approximation error depends on the state dimension of the underlying jump Markov linear system. Lastly, the sequential Monte Carlo method is widely known as PF. In brief, PF relies on approximating the distribution of the states by many weighted samples called particles.

Particle filters have the ability to handle non-linear, non-Gaussian scenarios, making them ideal for tracking applications. For example, particle filters have been used to fuse data from multiple sensors to track a target location over a sensor network that covers an area of interest. In these type of applications, data from multiple sensors are combined using fusion techniques to generate a more accurate measurement than from one independent sensor. Another example of the particle filter in a tracking application utilizes a technique of integrating multiple sensors to produce a human-following robot. Furthermore, particle filters can be used in conjunction with inertial sensors for motion tracking applications. Currently, sensor fusion is being utilized in navigation applications to provide more accurate positional solutions when GPS is unavailable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 11 shows algorithm 1, the pseudocode for the implemented algorithm.

DETAILED DESCRIPTION

Figure 1:
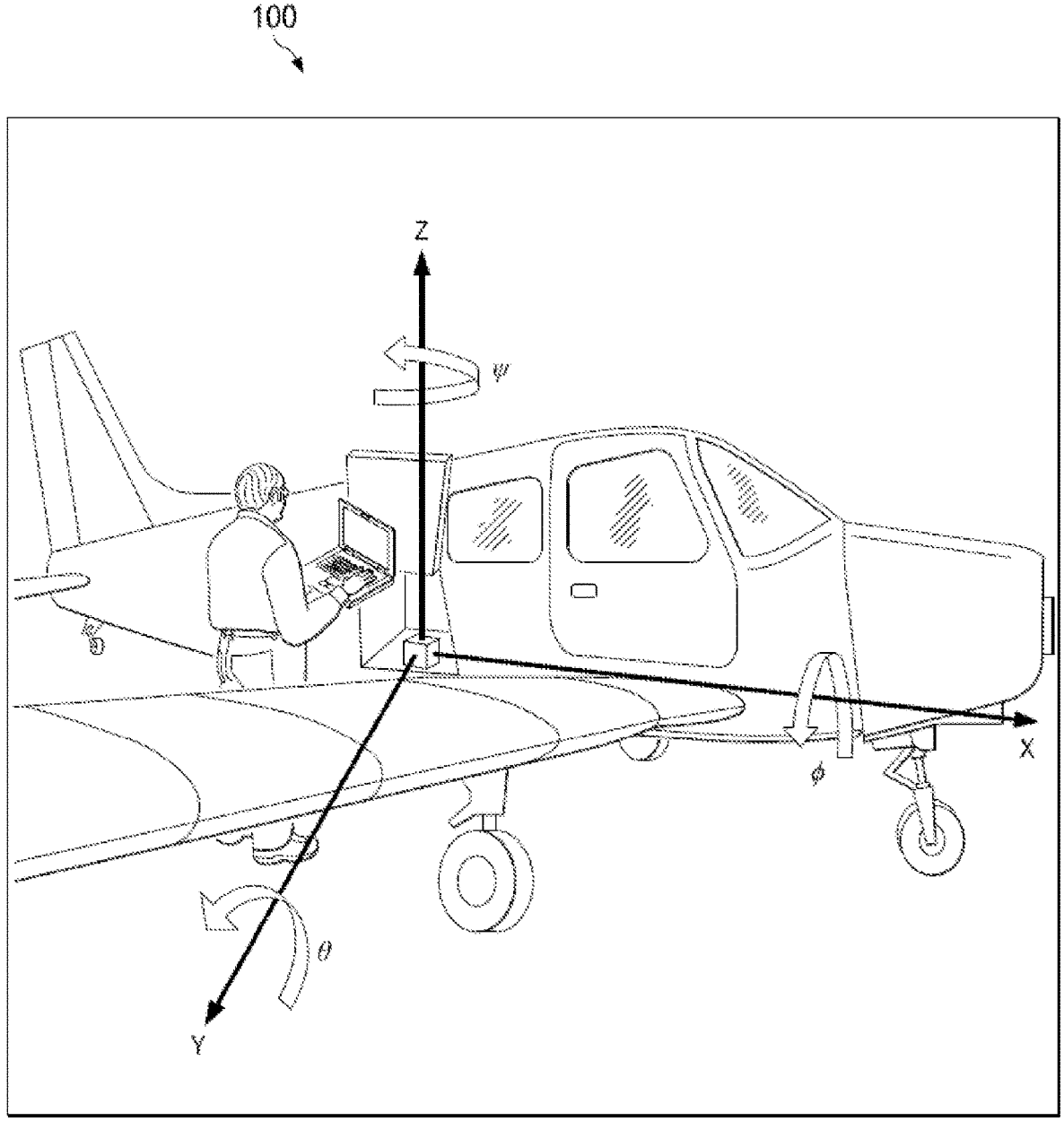
FIG. 1 shows Euler angles defined as rotations around the axis as follows: Roll ($\varphi$) is the rotation around X, Pitch ($\theta$) is the rotation around Y, and Yaw ($\psi$) is the rotation around Z.

The present disclosure describes in at least certain embodiments systems in which IMU and GPS positions were fused to obtain a more reliable position estimate of the navigating body. The methods disclosed herein are designed to produce position estimations at faster rates than what IMUS can provide using traditional fusion methods. The faster rates allow for a finer resolution navigation solution.

The finer resolution of the position data opens the door for applications that require position solutions for every sensor sample. For example, radar applications require precise position of the radar for each pulse in order to precisely measure the position of a detected target. In addition, radar sensors deployed on moving platforms can use this technique to indicate the relative position of the moving platform relative to some reference point of the observed scene on each pulse, which would be ideal for imagining modalities such as a SAR. This disclosure provides, in Example 1, a novel implementation of data fusion techniques to create up-sampled, finer-resolution position estimations. The disclosed algorithm is targeted specifically towards airborne imaging applications and solves the challenge of producing a precise position for each pulse of the radar as it flies along some intended flight path over some CPI. The use of a particle filter increases the position estimation as a real flight path will be inherently non-Gaussian and non-linear in nature due to wind gusts (e.g., updraft), non-uniform head and tail winds, and human involvement introducing random errors in motion stability (roll, pitch, yaw, etc.).

In general, the particle filtering technique has drawn increasing attention during recent years because of its superior ability to deal with processes that have nonlinear models or contain non-Gaussian noise sources. In particle filtering applications, multiple sensors are fused to track an object. However, the sensors fused are often range detection sensors rather than inertial measurement sensors. Particle filters have not been used to fuse multiple inertial sensors with GPS to provide a better navigation solution. Disclosed herein in Example 2 is a method of fusing outputs from multiple particle filters to obtain more optimal results. The method assigns sensor weights to each particle filter output. The weights are then used to produce a new particle cloud, and the expected value of the new cloud becomes the fused estimation of the navigating body. The weights of each sensor allow for the disclosed method to prioritize a set of sensor measurements. The prioritized measurements can be more intelligently combined to produce more accurate results. Simulation results are described and discussed.

The following abbreviations apply:
ASIC: application-specific integrated circuit
CRLB: Cramer Rao lower bound
cm: centimeter(s)
CPI: coherent processing interval
deg: degree(s)
CPU: central processing unit
DSP: digital signal processor
EO: electrical-to-optical
EKF: extended Kalman filter
FPGA: field-programmable gate array
GNSS-INS-sim: global navigation satellite system inertial navigation system simulation
GPS: Global Positioning System
GPU: graphics processing unit
GUI: graphical user interface
HAE: height above ellipsoid
hr: hour(s)
Hz: hertz
IMU: inertial measurement unit
kHz: kilohertz
m: meter(s)
MCMC: Markov chain Monte Carlo
MEMS: micro-electro-mechanical systems
MSL: mean sea level
NED: north, east, down
OE: optical-to-electrical PDF: probability distribution function
PF: particle filtering
PNT: position, navigation, and timing
PPD: posterior probability distribution
RAM: random-access memory
RF: radio frequency
RMSE: root-mean-square error
ROM: read-only memory
RX: receiver unit
s: second(s)
SAR: synthetic aperture radar
SIR: sequential importance resampling
SRAM: static RAM
SPAN: Synchronous Position, Attitude and Navigation
TCAM: ternary content-addressable memory
TX: transmitter unit
UKF: unscented Kalman filter
UPF: up-sampled particle filter
μg: micro-g-force(s).

Before describing various embodiments of the present disclosure in more detail by way of exemplary description, examples, and results, it is to be understood that the embodiments of the present disclosure are not limited in application to the details of methods and apparatus as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that certain embodiments of the present disclosure can be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the methods and apparatus of the embodiments of the present disclosure have been described in terms of particular embodiments, it will be apparent to those of skill in the art that variations may be applied thereto and in the steps or in the sequence of steps of the methods described herein without departing from the spirit and scope of the inventive concepts. All such similar substitutes and modifications apparent to those skilled in the art are deemed to be within the spirit and scope of the systems as defined herein.

As utilized in accordance with the methods and apparatus of the embodiments of the present disclosure, the following terms, unless otherwise indicated, shall be understood to have the following meanings.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±0.5%, or ±1%, ±2%, or ±3%, or ±4%, or ±5%, ±6%, or ±7%, or ±8%, or ±9%, or ±10%, or ±11%, or ±12%, or ±13%, or ±14%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 80% of the time, or at least 90% of the time, or at least 95% of the time, or at least 98% of the time.

Features of any of the embodiments described herein may be combined with any of the other embodiments to create a new embodiment. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50. Similarly, fractional amounts between any two consecutive integers are intended to be included herein, such as, but not limited to, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, and 0.95. For example, the range 3 to 4 includes, but is not limited to, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, and 3.95. Thus, even if specific data points within the range, or even no data points within the range, are explicitly identified or specifically referred to, it is to be understood that any data points within the range are to be considered to have been specified, and that the inventors possessed knowledge of the entire range and the points within the range. Reference to a series of ranges includes ranges which combine the values of the boundaries of different ranges within the series. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Thus, to further illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

The processes described in the present disclosure can be performed with the aid of a computer system running software adapted to perform the functions, and the resulting images and data are stored on one or more non-transitory computer readable mediums. Examples of a non-transitory computer readable medium include an optical storage device, a magnetic storage device, an electronic storage device or the like. The term "Computer System" as used herein means a system or systems that are able to embody and/or execute the logic of the processes described herein. The logic embodied in the form of software instructions or firmware may be executed on any appropriate hardware which may be a dedicated system or systems, or a specially programmed computer system, or distributed processing computer system. When the computer system is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the optical images, thermal images, RF information, or thereafter or combinations thereof.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), an ASIC, an FPGA, a combination of hardware and software, and/or the like. The term "processor" as used herein means a single processor or multiple processors working independently or together to collectively perform a task.

EXAMPLES

Certain embodiments of the present disclosure will now be discussed in terms of several specific, non-limiting, examples. The examples described below will serve to illustrate the general practice of the present disclosure, it being understood that the particulars shown are merely exemplary for purposes of illustrative discussion of particular embodiments of the present disclosure only and are not intended to be limiting of the claims of the present disclosure.

Example 1: Fine-Resolution Position Estimation Using Kalman and Particle Filter Fusion Techniques One non-limiting embodiment of the present disclosure is a system which utilizes the Novatel SPAN IMU-ISA-100C system utilizing the ProPak6™ interface. The system provides a GPS position at a rate of 20 Hz and an IMU measurement at a rate of 200 Hz. The system is comprised of a ProPak6™ receiver, a GPS antenna, and the IMU unit. The system contains a high-performance IMU that utilizes low-noise optical gyroscopes and MEMS accelerometers. The ProPack6™ receiver allows for the user to connect via an Ethernet cable. The user can then use the Novatel connect application to control and configure the system for data capture. The application allows a user to monitor the GPS satellite constellation and the signal strength, along with other diagnostic information. The user can also configure what logs are saved to the disk. The logs contain a variety of different information pertaining to GPS and IMU measurements. For example, the logs chosen contain the navigation body's latitude, longitude, and altitude from the GPS sensor. In addition, the accelerometer and gyroscope readings are recorded. Each log entry from both sensors is marked by a GPS time stamp. The final log is encoded as ASCII and saved as a text file. The file is then parsed into a table with columns containing the GPS time stamp, latitude, longitude, height, accelerometer, and gyroscope data. The values recorded from the Novatel unit are acceleration expressed in the body coordinate frame. In order to process the data in the local NED frame, the raw IMU values are rotated using a Euler rotation matrix shown in (1).

$$C_{bn}(k) = \begin{bmatrix} \cos(\phi(k))\cos(\theta(k)) & \cos(\phi(k))\sin(\theta(k))\sin(\psi(k)) - \cos(\psi(k))\sin(\phi(k)) & \sin(\phi(k))\sin(\psi(k)) + \cos(\phi(k))\cos(\psi(k))\sin(\theta(k)) \\ \cos(\theta(k))\sin(\phi(k)) & \cos(\phi(k))\cos(\psi(k)) + \sin(\phi(k))\sin(\theta(k))\sin(\psi(k)) & \cos(\psi(k))\sin(\phi(k))\sin(\theta(k)) - \cos(\phi(k))\sin(\psi(k)) \\ -\sin(\theta(k)) & \cos(\theta(k))\sin(\psi(k)) & \cos(\theta(k))\cos(\psi(k)) \end{bmatrix} \quad (1)$$

The rotation sequence used for the rotation matrix is ZYX. The rotation angles of φ, θ, and ψ are defined as roll, pitch, and yaw, respectively, as shown in FIG. 1. The gyro values are used as the change in roll, pitch, and yaw values. The Earth spin rate and the rate of the NED frame is also included in these measurements and needs to be removed in order to obtain accurate attitude estimation. Attitude is an aircraft's orientation relative to Earth's horizon. The Earth spin rate $\omega_{ie}^n$ is notated as the rate of the Earth-centered fixed frame (e) with respect to the inertial frame (i) resolved in the NED frame (n). Similarly, the rate of rotation of the NED frame is represented as the e frame with respect to the NED frame (n) resolved in the NED frame. In short, $\omega_{ie}^n$ represents the Earth spin rate transformed to the NED frame, and $\omega_{ne}^n$ is the rate of change the NED frame (experiences as the Earth rotates. To remove the Earth rotation rate, $$\omega_{ie}^i = [7.292115e^{-5}]\left(\frac{\text{rad}}{\text{s}}\right),$$

is converted to the body frame by multiplying the previous rotation matrix $C_{bn}(k-1)$ with $\omega_{ie}^i$. The same is done for the rate experienced by the NED frame by:

$$\omega_{en}^e = \begin{bmatrix} \dfrac{v_E(k-1)}{r_{neff}} \\ -\dfrac{v_N(k-1)}{r_{meff}} \\ \dfrac{v_E(k-1)\tan(p_L(k-1))}{r_{neff}} \end{bmatrix} \quad (2)$$

where the latitude $p_L$ and velocity of the navigating body, [$v_N\ v_E\ v_D$], is combined with the effective meridian $r_{meff}$ and transverse radius $r_{neff}$ of the Earth to get $\omega_{ie}^n$. The meridian and transverse radii of the Earth are calculated using:

$$r_m(k) = \frac{R_0(1-e^2)}{(1-e^2\sin^2(p_L(k)))^{3/2}} \quad (3)$$

$$r_{meff}(k) = r_m + p_{alt}(k) \quad (4)$$

where $r_m$ is the meridian radius of curvature, $R_0$ is the Earths equatorial radius, e is the Earth's eccentricity, and $r_{meff}$ is the effective meridian radius at the current altitude and latitude. The corrected gyro measurements are calculated by:

$$\omega_{true}(k) = \tilde{\omega} - C_{bn}^T(k-1)((\omega_{ne}^n) + (\omega_{ie}^n)) \quad (5)$$

where $\omega_{true}(k)$ is the true attitude rates and $\omega^\sim$ are the measured gyroscope values. The values are then added to the previous attitude to produce the current attitude of the platform. The attitude is then used in (1) to calculate the rotation matrix for converting from the body frame to the NED frame. The rotation matrix ($C_{bn}$) is then used to rotate the acceleration vector to the NED frame. The transformation of the acceleration vector can be calculated using:

$$a(k) = (C_{bn}(k-1) - C_{bn}(k))(IMU_{meas})\frac{dt}{2} + E \quad (6)$$

where a(k) is the current acceleration, $IMU_{meas}$ are the accelerometer values in the body frame, and dt is the change in time. Lastly, E is the Earth's accelerations measured by the accelerometer. The Earth's accelerations include gravity, as well as the rotation of the Earth. The current acceleration values are then used to calculate the current velocity v(k). The position is then calculated from v(k). For the altitude component of position, the calculation is straight-forward and can be calculated using:

$$p_{alt}(k) = p_{alt}(k) + v_D(k)\frac{dt}{2} \quad (7)$$

where $p_{alt}$ is the altitude component of position and $v_D(k)$ is the velocity in the down component of the NED frame. As for the latitude, the equation must take into account the curvature of the Earth.

Combining (3) and (4) allows for the latitude rate of change to be calculated in:

$$\dot{p}_L = \frac{v_N(k)}{r_{meff}(k-1)} + \frac{v_N(k)}{r_{meff}(k)} \quad (8)$$

where $v_N(k)$ is the current velocity in the north direction of the NED coordinate frame. Finally, the latitude coordinate is calculated by:

$$p_L(k) = p_L(k-1) + \dot{p}_L(k)\frac{dt}{2} \quad (9)$$

where $p_L(k)$ is the current latitude coordinate and $p_L(k-1)$ is the latitude coordinate for the previous time step. Similarly, calculation of the longitude value requires taking into account the curvature of the Earth. However, instead of the using meridian radius of the Earth, the transverse curvature of the Earth must be calculated. The calculation of the transverse curvature of the Earth differs from the meridian as shown in:

$$r_n = \frac{R0}{\sqrt{1-e^2\sin(p_L(k))}} \quad (10)$$

and the effective transverse radius is calculated by:

$$r_{neff}(k) = r_n + p_{alt}(k). \quad (11)$$

The rate of change in longitude is then calculated very similarly to the rate of change in latitude as shown by:

$$\dot{\lambda}(k) = \frac{v_E(k)}{r_{neff}(k)\cos(p_L(k))} + \frac{v_E(k)}{r_{neff}(k)\cos(p_L(k))} \quad (12)$$

where $v_E(k)$ is the velocity in the east component of the NED frame. The final longitude coordinate is then calculated using $\lambda$ and the duration of the time step as shown by:

$$p_\lambda(k) = p_\lambda(k-1) + \dot{\lambda}(k)\frac{dt}{2}. \quad (13)$$

I. Filters

A. Kalman Filter

The Kalman filter is popularly used to fuse two measurements together with a weighting function. The Kalman filter is broken into two stages: the prediction stage and the update stage. In the prediction stage, a prediction of where the measurement should be is calculated using a mathematical model of the system. The matrix representation of the Kalman filter prediction using the system model is shown in (14):

$$\begin{bmatrix} p_k \\ v_k \end{bmatrix} = \begin{bmatrix} 1 & \delta t \\ 0 & 1 \end{bmatrix} \begin{bmatrix} p_{k-1} \\ v_{k-1} \end{bmatrix} + \begin{bmatrix} \frac{1}{2}\delta t^2 \\ \delta t \end{bmatrix} [a_k] \quad (14)$$

(14) is a simplified form of the system model. In practice, (7), (13), and (9) are implemented for $p_k$ and acceleration values calculated from (6) are used for calculating $v_k$. In the update step, the Kalman filter takes the measurement produced by the GPS sensor and fuses it with the estimated measurement. The Kalman filter then determines the probability that the GPS measurement is the truth value. The final value produced by the Kalman filter is the fusion of the math model, described in (14), and the GPS sensor measurement. The amount of compensation is decided by a confidence factor known as the Kalman gain.

The results of the Kalman filter can be fed back into the algorithm as the estimate for the previous time step ($x_{k-1}$) to allow the Kalman algorithm to be executed recursively. The recursion produces a fusion of two sensors at every time step. In the GPS and IMU application, the Kalman filter algorithm may be used only when a GPS measurement is present. For instance, the GPS measurement is fused with the most recent position prediction from the system model to provide a more precise position estimate. As the GPS measurements become available, the fusion via the update step of the Kalman filter is utilized to incorporate the GPS values into the new prediction. The product of the Kalman filter fusion creates an INS solution capable of producing position estimations when the GPS sensor is unavailable.

B. Particle Filter

The particle filter is another method of fusing data measurements. In general, the particle filtering technique has drawn increasing attention during recent years because of its superior ability to deal with processes that have nonlinear models and contain non-Gaussian noise sources. Therefore, this disclosure also explores the method of fusing IMU and GPS measurements with a particle filter as the intended application will be non-linear and non-Gaussian in nature.

Unlike the Kalman filter, the particle filter does not require the distribution of the measurements to be Gaussian. The particle filter is a sequential Monte Carlo method based on Bayesian theory. The idea is to calculate a number of possible outcomes at each state of the system. The number of possible outcomes is represented as a cloud of particles. At each state, every value of the particle cloud is propagated to the next state. In doing so, a Monte Carlo method is sequentially implemented at each state. In addition, the system model is not required to be linear. Particle filters are more flexible as the system could contain non-linear behavior or non-Gaussian distributions. Consider a system where position ($p_k$) and velocity ($v_k$) at a state k are modeled by the following two non-linear functions:

$$p_k = F(x) + Q_k \quad (15)$$

and $$v_k = G(x) + R_k, \quad (16)$$

where $F(x)$ and $G(x)$ are non-linear functions and the process noise is represented by $Q_k$ and $R_k$.

$$P(A|B) = \frac{P(B|A)P(A)}{P(B)} \quad (17)$$

Applying the law of probability in (18)

$$P(B) = \Sigma P(B|A)P(A) \quad (18)$$

to Bayes's theorem (17), the extended form of Bayes's theorem allows for the posterior distribution to be represented in (19), as given by:

$$P(A|B) = \frac{P(B|A)P(A)}{\sum_{i=1}^{t=N} P(B|A)P(A)}. \quad (19)$$

Combining equations (15), (16), and (19) allows for the posterior distribution of the non-linear system be modeled by equation (20) as follows:

$$P(p_{0:k}|v_{1:k}) = \frac{P(v_{1:k}|p_{0:k})P(p_{0:k})}{\sum_{i=1}^{i=N} P(v_{1:k}|p_{0:k})P(p_{0:k})} \quad (20)$$

Particle filters utilize the importance sampling concept, where each particle in the cloud is assigned a weight. The weights in (21) need to be normalized when used in the importance sampling:

$$w_k^j = w_{k-1}^j \frac{P(v_k|p_k^j)P(p_k^j|p_{k-1}^j)}{\rho(p_k^j|p_{0:k}^j, v_{1:k})} \quad (21)$$

where $w_k^i$ is the weight for sample i and $\rho(p_k^i|p_{0:k}^i, v_{1:k})$ is the proposed probability function. The weights are used to estimate the posterior distribution of the estimated position and velocity. Lastly, the posterior particles for position and velocity are drawn from the posterior distribution of position and velocity, respectively.

Particle filters can degenerate as particle weights can diminish to zero. In order to mitigate this issue, the concept of resampling is used. Resampling is used in particle filters to mitigate the sample degeneracy problem (i.e. ensures that the particle filter has enough particles to progress to the next state). However, resampling introduces variance into the filter results and can also introduce a new problem called "sample impoverishment." This means that, after resampling, it is possible to have a large number of repeated copies of identical particles, especially when the variance of the measurement noise is small. This phenomenon causes the loss of sample diversity. In this case, MCMC methods can be introduced to mitigate this problem, which is known as "MCMC move" in particle filtering. In practice, it is best to limit the amount of times a particle cloud is resampled.

The particle filter is broken down into multiple steps. The first step initializes a particle cloud with an expected value equal to the initial position of the platform. The second step moves the point cloud by a motion model. The third step resamples the values in the point cloud. The last step produces the position estimate by calculating the expected value of the resampled point cloud. The resampling step is required to remove samples in the point cloud that are the least likely to be the true position while maintaining the number of particles in the point cloud. Removing samples with the least likelihood of being the true position allows for the particle filter to converge to the true position. If the resampling technique is not effectively implemented, the particle cloud can degenerate, meaning the particle cloud will produce erroneous predictions.

Particle filters allow for a distribution to be proposed in solving for position estimation. Assuming the samples within the particle cloud are independent, the expected value of the particle cloud will be an unbiased estimate of position. Furthermore, the law of large numbers shows that the position estimates from the particle filter will converge to the true position. Using particle filters, the posterior position estimate can be calculated using equation (22):

$$p_k = \frac{1}{N}\sum_{i=1}^{N} F(x^i) \qquad (22)$$

where $p_k$ is the 3-dimensional position at the current time step, $F(x^i)$ is the particle cloud, and N is the number of samples in the particle cloud. If the system cannot be modeled with Gaussian distributions, the particle filter equation (22) is modified to utilize a weighted sum as shown in equation (23):

$$p_k = \frac{1}{N}\sum_{i=1}^{N} F(x^i)\omega(x^i), \qquad (23)$$

where $$\omega(x^i) = \frac{f_x(x)}{q(x)}$$

and $f_x(x)$ is the true PPD of position measurements and $q(x)$ is the PDF of the particle cloud.

II. Position Interpolation

In the SPAN system, the GPS is updated at a rate of 20 Hz, whereas the IMU is updated at a faster rate of 200 Hz. On average, there are ten IMU measurements between two GPS position measurements. The IMU measurements provide acceleration of the navigation body along a Cartesian coordinate system. The coordinate system is centered on the navigating body's center of gravity. The position and velocity of the navigating body can be estimated from the IMU measurements using the system model in (14).

As noted above, a faster rate of producing accurate data measurements in radar applications may be required. Radar requires a position estimate for each measurement in order to accurately locate a detected target. In order for a radar to detect moving targets, a fast sampling rate is required to increase velocity resolution. Typically, a radar samples at rates on the order of kHz to achieve the desired velocity resolution. One method of increasing the resolution of the position estimates provided by the INS system is to interpolate the time vector used to estimate the position updates. The interpolated time vector is then used to estimate positions more frequently. This disclosed method up-samples the position solutions given by the INS by applying a linear interpolation in time to produce time epochs at the desired resolution. Herein, two estimation methods are implemented that utilize an up-sampled time vector to achieve finer resolution position estimates, as discussed below.

A. Kalman Filter Interpolation

The Kalman filter implemented herein uses the interpolated time vector and the most recent position, velocity, and acceleration to model the position at each time step. The Kalman filter then estimates the position at each up-sampled epoch using the model described in (14) and fuses the estimates with the solutions provided by the GPS sensor. The model estimates are used to provide position estimates at a more frequent rate, while the fusion technique minimizes the drift of the model estimates. The result is position updates that occur on the specified time resolution.

Figure 2:
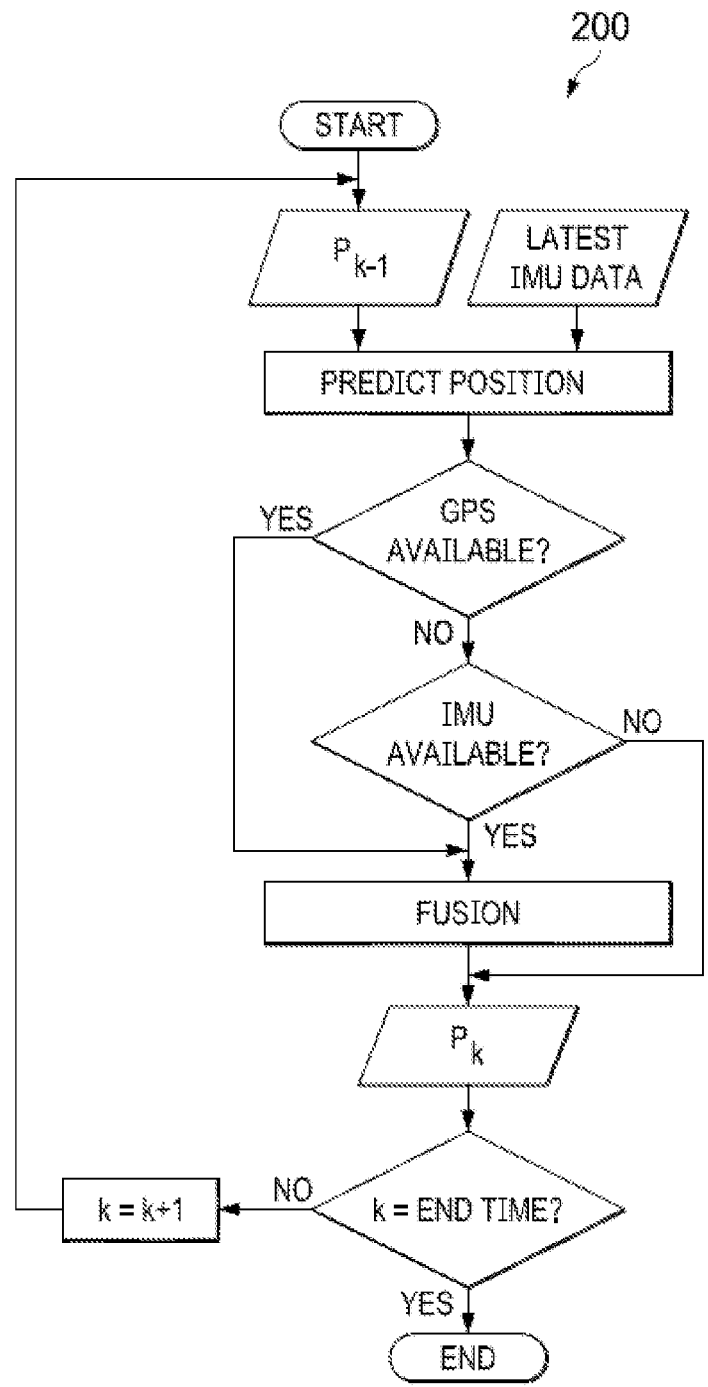
FIG. 2 shows a flowchart for the fine resolution algorithm. The latest IMU data are used to propagate the previous position $p_{k-1}$ as a prediction for the next state. If a GPS measurement is available, it is fused with the prediction to produce the new position $p_k$. The latest IMU measurement is used to predict the next position at the up-sampled time epochs.

The algorithm uses the latest acceleration data from the IMU with the previous position, $p_{k-1}$, to estimate the new position, $p_k$. The last known IMU measurement is used to predict the next position until a new IMU measurement is provided. The algorithm detects if a new measurement is available by comparing the next time epoch (k) to the timestamp of the latest acquired IMU data. The algorithm continues to predict positions during the up-sampled time epochs. The IMU measurements may be only updated when the up-sampled time epoch aligns with the next IMU measurement's timestamp. The estimated position is fused via the Kalman filter with GPS in order to produce a position update accurate with GPS data. The flow chart for the described algorithm is shown in FIG. 2. The implementation herein utilizes the Kalman filter output described in I.A above in order to simplify the GPS and IMU fusion. The output of the method described in I.A provides fused IMU and GPS position estimates on the IMU timescale. The implementation uses the up-sampled time scale and the last available IMU measurements to estimate position solutions in between the IMU timescale. The new estimated solutions are then fused with the IMU and GPS position estimates from I.A.

B. UPF

Figure 3:
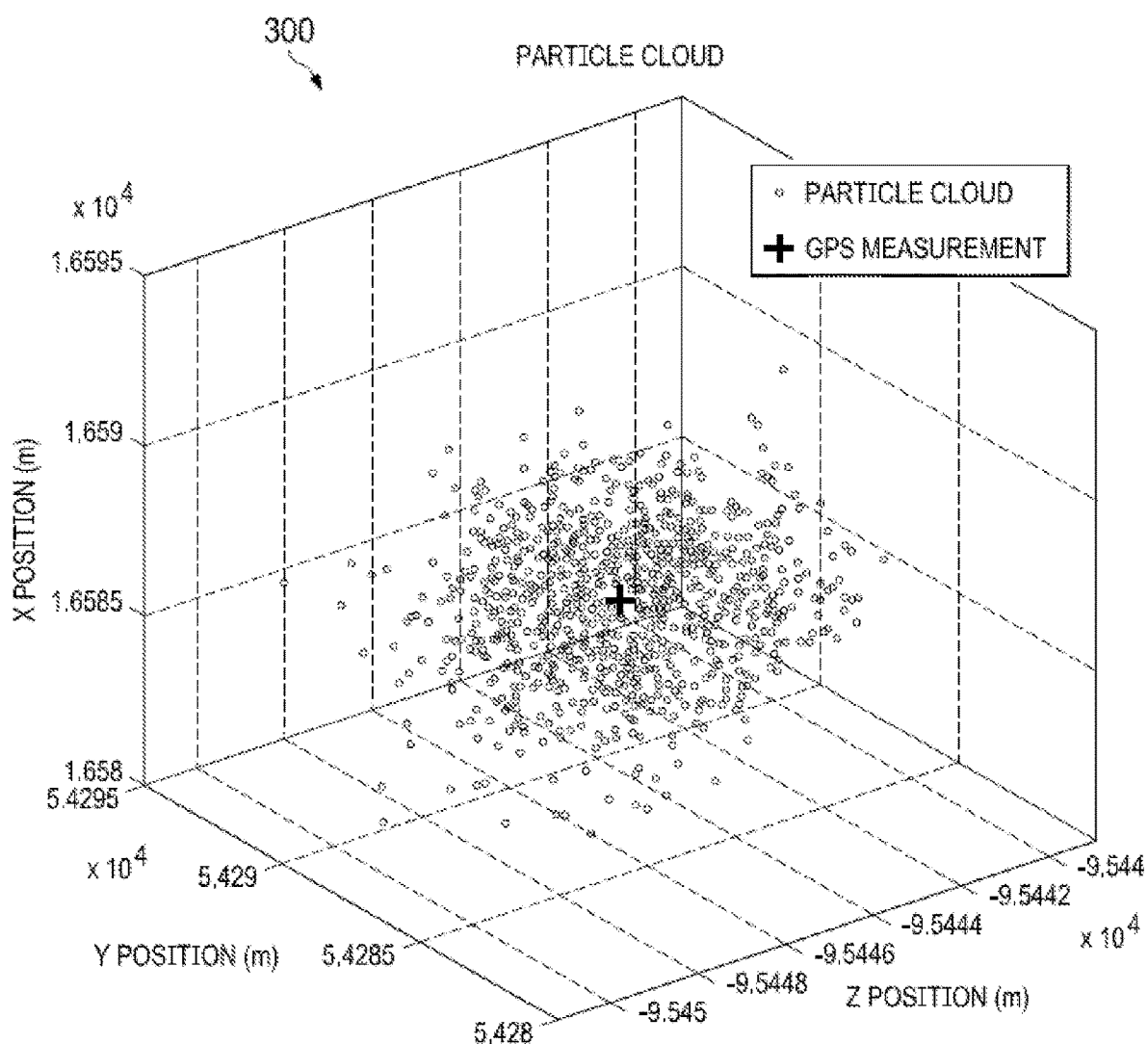
FIG. 3 shows an example of a particle cloud having $2 \times 10^3$ particles with a mean close to the GPS measurement.

The particle filter implementation utilizes the same up-sampled time vector and the latest IMU values to propagate the particle cloud to the next position. Each sample in the particle cloud is propagated to the next position using (14). In this implementation, the proposed distribution is a Gaussian distribution with a variance equal to the variance in GPS measurements when the platform is stationary. The particle cloud is initialized with the proposed distribution with an expected value equal to the first GPS measurement. Each time the particle filter is propagated, a small amount of process noise is added to incorporate compounding errors. The weighting function used to determine the importance of each sample is the PPD of a normal distribution shown in (24) as:

$$f(x) = \frac{1}{\sqrt{2\pi\sigma^2}} e^{-\frac{(x-\mu)^2}{2\sigma^2}} \quad (24)$$

where σ is the standard deviation and μ is the mean. The weighting values are then used to resample the particle cloud. The resampling algorithm randomly samples the point cloud based on the cumulative sum of the weighting values. This technique allows for values that have a larger likelihood of being correct to be chosen and allows the algorithm to converge on the true value over time. The resampling step may be done only when a measurement based on sensor data is available. Resampling the particle cloud when there is GPS data available allows for the cloud to converge towards the true position. An example of the particle cloud compared to the GPS measurement is shown in FIG. 3. The UPF algorithm provides the update rates required to generate fine-resolution position estimations.

III. Simulation

Figure 4:
FIG. 4 shows a path simulated by Acienna. The path includes an initial rise to altitude and then has a number of switchbacks. This path is simulated based on a series of defined change rates and duration values.

The disclosed method was tested against simulated GPS and IMU measurements. The simulation leveraged the open source Python-based GNSS-INS-sim developed by Acienna. A path was simulated using the simulator as shown in FIG. 4. The simulator also generated the truth and measured values for the gyro values and accelerometer values. In addition, the simulator produced the truth path and the GPS measured values for position and velocity. The simulated IMU values utilize the characteristics of the Novatel IMU shown in Table 1.

TABLE 1

Analog Devices IMU-ISA-100C Specifications

| Parameter | Value |
| --- | --- |
| Gyro Bias | 0.0 deg/√hr |
| Gyro Angle Random Walk | 0.012 deg/hr |
| Gyro Bias Stability | 0.5 deg/hr |
| Accelerometer Bias | 0.0 m/s² |
| Accelerometer Velocity Random Walk | 100 μg/√hr |
| Accelerometer Bias Stability | 1250 μg |

Figure 5:
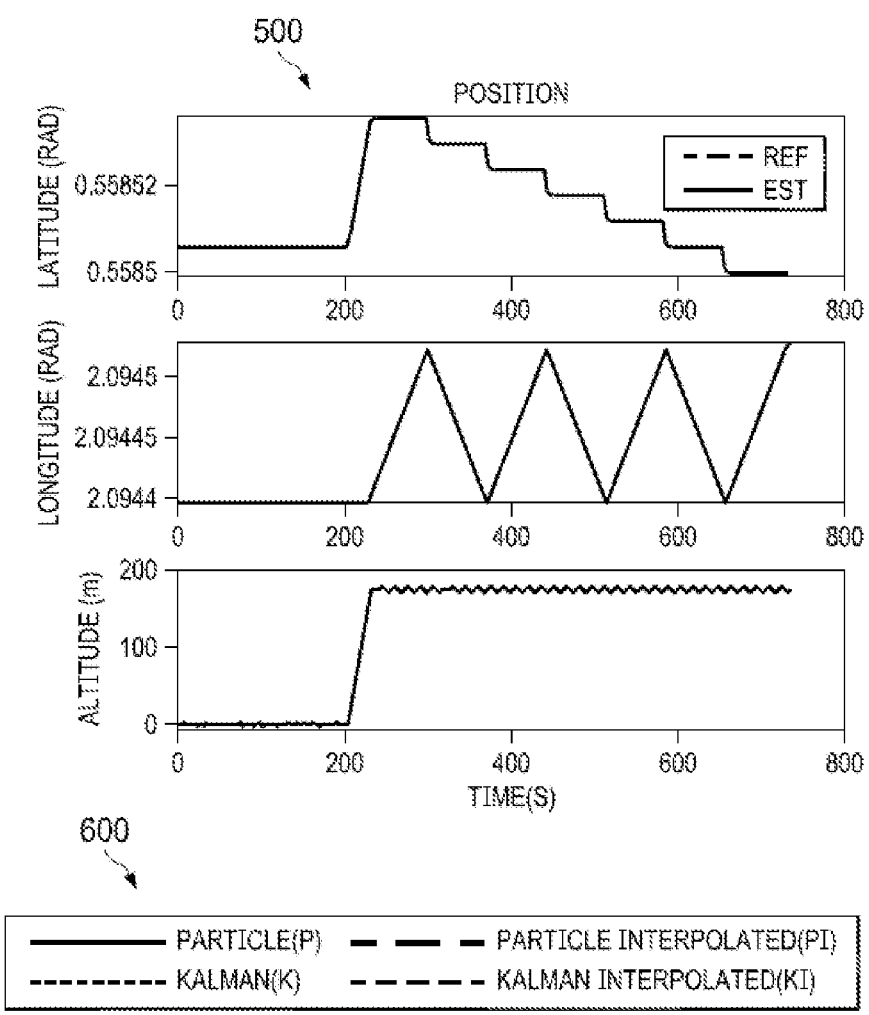
FIG. 5 shows the results of simulated values. The results are produced using the simulated measured values. The reference path, shown in blue, is the true path generated by the simulator. The estimated path, shown in orange, is the path calculated by the algorithm.
Figure 6:
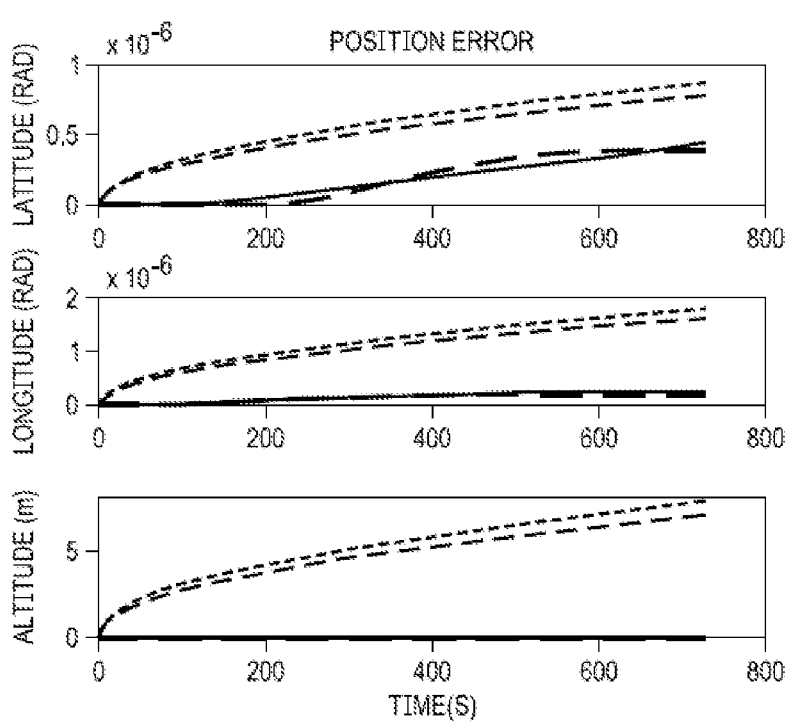
FIG. 6 shows longitude errors of simulated values without interpolation technique. The line labeled P shows the particle filter results compared to a simulated true path. The line labeled K represents Kalman results compared with the simulated true path. The interpolated results for both particle (PI) and Kalman (KI) are shown.

The simulator also provides true attitude determinations at each sample. The Kalman and the particle filter interpolation methods are applied to the measurements produced by the simulator and the accuracy of each method is calculated. Just like the Novatel unit, the IMU acceleration values produced by the simulation are rotated using the matrix shown in (1) and processed in the NED coordinate frame. The results of the processed simulation values are shown in FIG. 5. The results of the algorithm show that the estimated path closely follows the true path. The Kalman and particle filter methods are implemented for the simulated values. At first, the methods are implemented without the interpolation algorithm disclosed herein. The position errors for the different algorithm results are shown in FIG. 6 with and without interpolation. For the interpolated Kalman and particle filter methods, the errors of the estimated positions are calculated. From the figure, it can be seen that the interpolation method does provide a slight increase in positional accuracy. In addition, the particle filter method provides a significant improvement of positional accuracy than the Kalman filter. However, particle filters require an increase in computational complexity. In the present disclosure, the computational requirements are not measured and only the accuracy of the results is evaluated.

Overall, the simulated IMU values give impressive results for the algorithm. The two fusion algorithms are proven to provide accurate results. The particle filter provides more accurate results than the traditionally used Kalman filter. These observations were proven through the simulations. More importantly, the interpolation method produced more accurate results for the estimation algorithms, while simultaneously providing position updates at the desired rate. These results show that the interpolation method does in fact produce fine-resolution position estimations at the rates required for radar applications.

IV. Instrumentation and Results

The Novatel Span system was instrumented on a vehicle and driven on a predetermined path. The GPS antenna was mounted in an open sunroof, and the IMU was placed near the center of the vehicle. The ProPak6™ unit was placed in the center console of the vehicle. The ProPak6™ unit was connected via an Ethernet crossover cable to a laptop that recorded the data, measuring latitude, longitude, and height. The paths were processed with both Kalman and particle filters with and without the interpolation method disclosed herein. The path is a short path that traversed a lap around a small neighborhood area at relatively slow speeds. The Novatel system performs a kinematic alignment to initialize the orientation of the IMU. The kinematic alignment method uses the GPS velocity vector to determine heading. For the algorithms implemented, the heading was initialized to north. In order to instrument this, the vehicle was positioned with the initial heading of north. This was done by observing the GUI provided by the Novatel connection interface. Once the orientation was relatively close to true north, the kinematic alignment was initiated. Data for the traversed path were only captured after alignment and initialization were complete. The task of capturing the true path traversed by the instrumented system is not trivial. As a result, the error between the position solutions could not be calculated. In efforts to show the performance of the algorithm, the estimated paths were plotted on Google Earth.

A. Kalman Results

Figure 7:
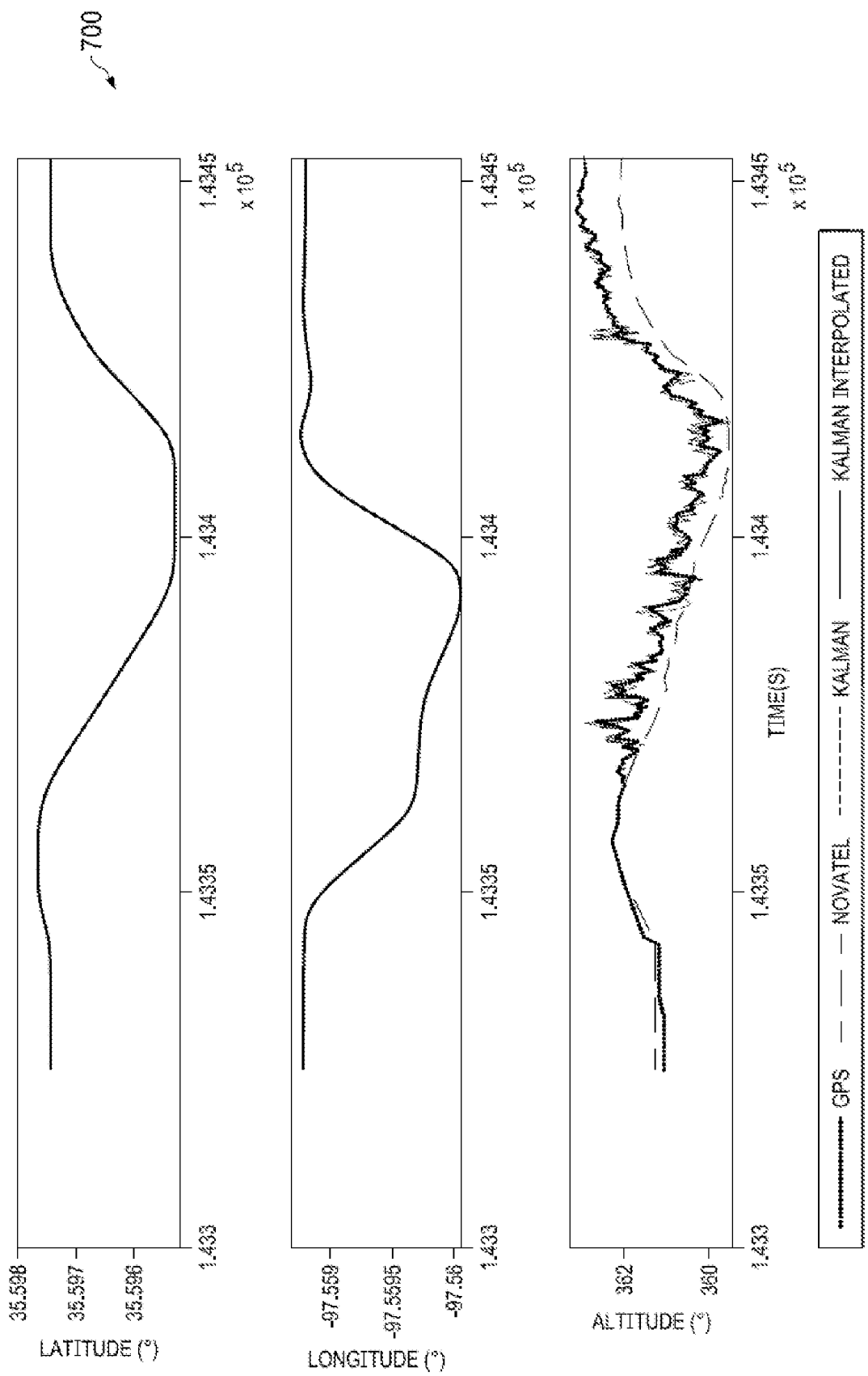
FIG. 7 shows Matlab Kalman algorithm results. Latitude and longitude are nearly the same between all four results. Altitude is the same for GPS, Kalman, and Kalman-interpolated algorithms. Novatel altitude is converted from HAE to MSL, which is the cause for the altitude discrepancies.

The instrumented data were processed using both the regular Kalman filter and the interpolated Kalman filter. The results show that the algorithm accurately predicts position given the acceleration measured by the IMU. The fine-resolution method described in II.A produced position estimates at a higher frequency than the output of the GPS and IMU. The algorithm up-sampled the 200 Hz update rate of the IMU to a faster rate of 3 kHz, or 15 times faster providing 15 times the positional resolution. In addition, the higher frequency positions agree with the values produced by the Novatel system as well as the GPS coordinates. The up-sampling method did not introduce additional error when producing higher frequency position estimations. By using a Kalman filter to fuse sensor positions with the up-sampled predictions, the algorithm preserves the benefits of drift correction provided by the Kalman filter, while providing faster position updates. The results of the processed positions plotted in Matlab are shown in FIG. 7. The results for the Kalman and interpolated Kalman algorithms correlated well to the GPS and Novatel solutions for latitude and longitude. For altitude, the Novatel system produced results in HAE, and the GPS and Kalman algorithms produced results in MSL. As a result, the conversion from HAE to MSL is an estimation, which is why the Novatel altitude differs from the implemented algorithms.

B. UPF Results

Figure 8:
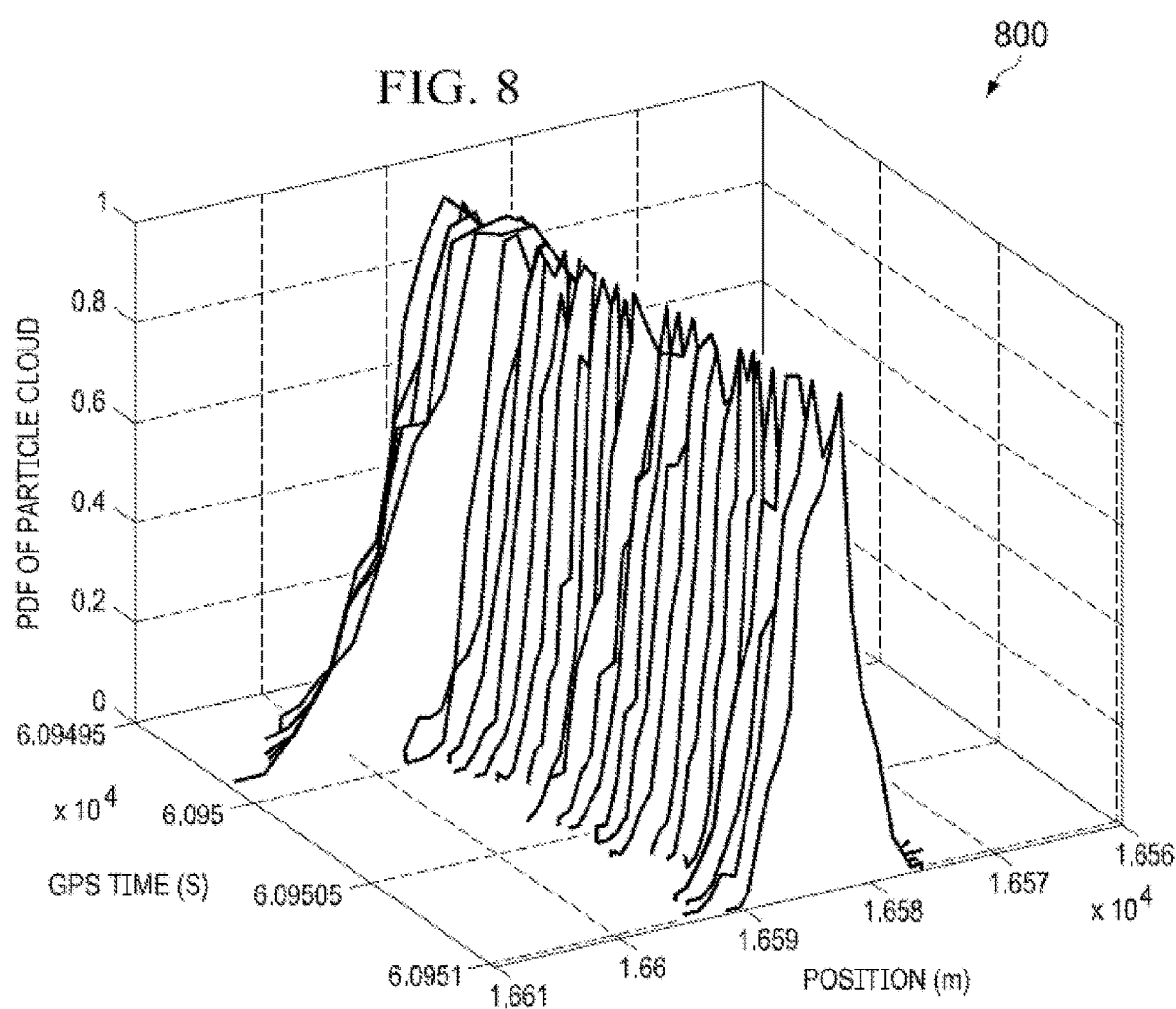
FIG. 8 shows PDF evolution of a particle filter over time. The variance of the distribution of the particle cloud shrinks with every resample of the cloud. As a result, the cloud converges to an answer closer and closer to the true value.

Particle filter results were plotted on top of the GPS measurements. The particle filter provided a similar solution to the Kalman method. The position estimates were accurate and aligned with the GPS measurements. The proposed normal distribution was sufficient in allowing the particle filter to converge on the GPS measured values. The results of the particle filter utilized a particle cloud with $2 \times 10^3$ samples. The particle filter was resampled based on the method described in I.B. The evolution of the particle cloud distribution over time is shown in FIG. 8. The distribution of the particle cloud initially has a large variance. As the particle filter transitions in states and is resampled, the variance of the particle cloud decreases. As the variance decreases, the mean of the particle cloud becomes accurate and can be used as a more accurate estimated position at each time step.

Figure 9:
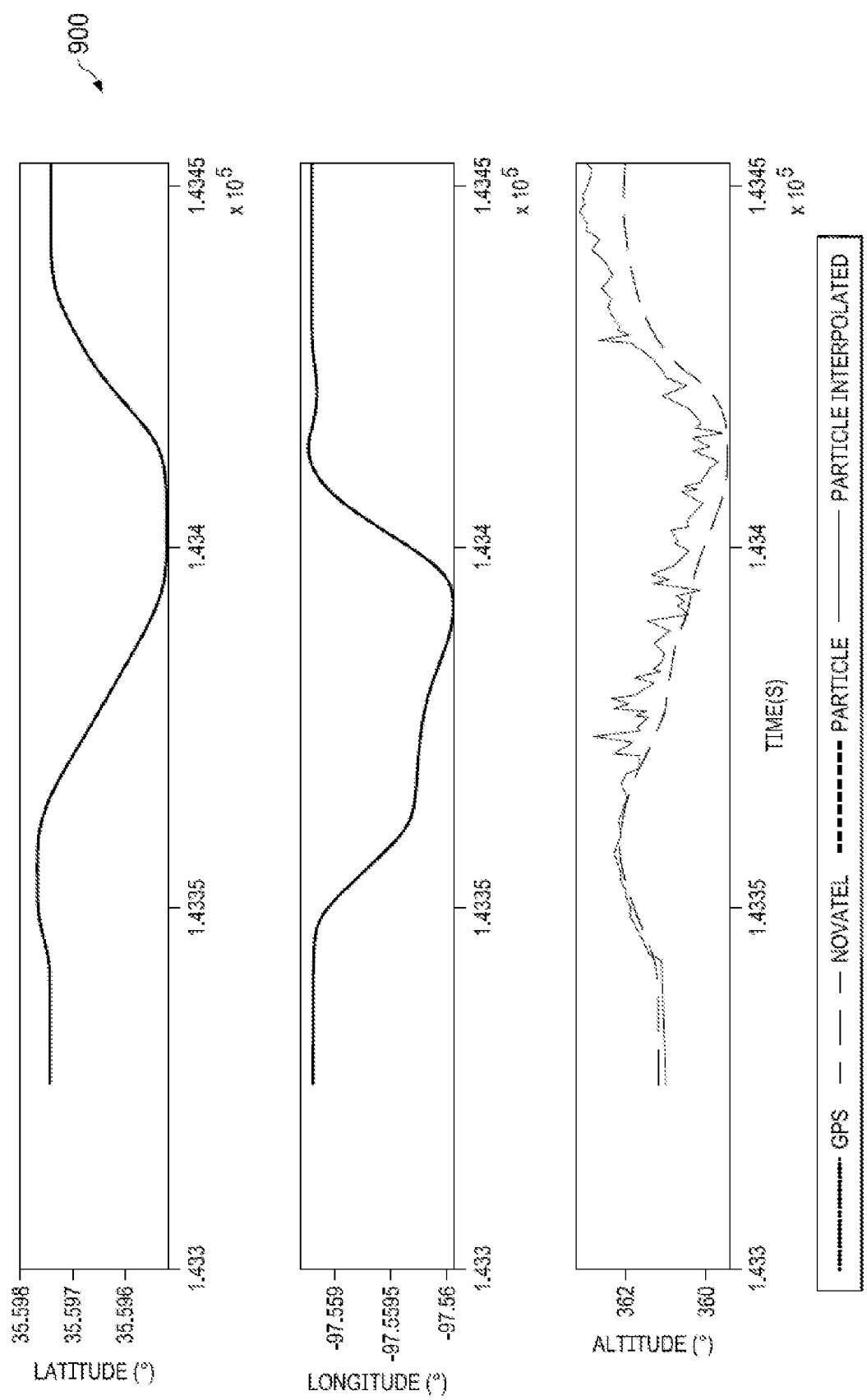
FIG. 9 shows results of the particle filter interpolation. The regular particle filter (yellow) and the interpolated particle filter (purple) are aligned with the GPS (blue) and Novatel (orange) solutions.

The implemented particle filter was also modified to produce finer resolution position estimates. In order to interpolate using the particle filter, the time vector needed to be up-sampled to the desired resolution. The method described in II.B can be implemented with the up-sampled time vector to interpolate the position estimates. The implemented method was successful, and the results successfully interpolated the position estimates. The results of the position estimates are shown in FIG. 9. The particle filter interpolation result showed smoother interpolation between the GPS measurements. The interpolated results also produced position estimates 15 times faster than the IMU sampling speed.

In this example, a novel UPF algorithm is presented. The algorithm outperforms the Kalman filter technique with a similar up-sampling technique applied. This finding has been confirmed through both simulated and instrumented data. In addition, the simulations show the particle filter outperforms the Kalman filter. In the instrumented data, the IMU matched the specs used in the simulation. The results of the instrumented data show the algorithm provided excellent results while introducing a negligible amount of error. The algorithm has been proven to produce highly accurate position estimates at rates that are 15 times faster than the Novatel IMU. The UPF technique is ideal for airborne imaging modalities such as SAR. The technique allows for exquisite position solutions to be aligned to every pulse of a high-resolution SAR, where position alignment on a pulse-by-pulse basis of the radar is critical in producing highly-focused, fine-resolution SAR imagery.

GPS and IMUs are often combined to produce navigation systems for airborne imaging platforms. However, the current state-of-the-art radar technology allows for radars to pulse at very high rates. The GPS and IMU update rates are not fast enough to accurately report platform position for each radar pulse. In addition, independent GPS and IMUs cannot provide positional accuracy for long-term stability. Traditional sensor fusion techniques, such as the Kalman and particle filters, can be used to combine GPS and IMU measurements. The Kalman filter works well for linear and Gaussian systems, whereas the particle filter excels in non-linear and non-Gaussian systems. Sensor fusion is used to help correct for IMU errors and provide better positional accuracy. However, the fusion algorithms cannot provide faster update rates. Disclosed herein is a modified particle filter that utilizes an up-sampling technique to provide highly accurate position estimates at rapid update rates. This technique compensates for Earth's rotation in the IMU measurements to provide long-term stability in the position estimates. The disclosed algorithm has been proven through simulations and instrumentation with a Novatel IMU. The novel UPF algorithm, developed herein, is able to provide highly accurate position estimations at rates that are 15 times faster than the IMU sampling rate.

Example 2. Multi-Particle Filter Sensor Fusion Based on SIR

This example is focused on the integration of multiple position estimations for a navigating body. The position estimations come from different motion sensors, each resolved using a particle filter. The particle filters were chosen for their flexibility and ability to handle non-linear, non-Gaussian systems. The position of the navigating body is calculated using IMUs of various qualities. The final estimation of the navigating body is obtained by fusing the results from the different sensors. The fusion technique presented utilizes principles from SIR. The resampling step is important for the particle filter technique to converge to an accurate estimate. The disclosed method treats each sensor as a particle in a particle filter and applies SIR principles in order to achieve a more accurate position estimation.

I. Particle Filter

Unlike the Kalman filter, the particle filter does not require the distribution of the measurements to be Gaussian. The particle filter is a sequential Monte Carlo method based on Bayesian theory. The idea is to model multiple possible outcomes at each state of the system. At each state, the particle cloud of possible outcomes is propagated to the next state using a system model. In doing so, multiple outcomes can be simultaneously implemented at each state. The multiple outcomes can then be evaluated to obtain an optimal response. The position and velocity of the navigating body can be estimated from IMU measurements using (25) and (26), given as:

$$p_k = p_{k-1} + v_k \delta t + \tfrac{1}{2} a_k \delta t^2 \quad (25)$$

and $$v_k = v_{k-1} + a_k \delta t \quad (26)$$

where $p_k$ is the 3-dimensional position at the current time step, $p_{k-1}$ is the 3-dimensional position at the previous time step, $v_k$ is the 3-dimensional velocity at the current time step, $a_k$ and $a_{k-1}$ are the 3-dimensional accelerations at the current and previous time steps, respectively, and $\delta t$ is the time difference between the previous and current time step.

As noted in Example 1, particle filters utilize the importance sampling concept in which each particle in the cloud is assigned a weight. The idea is to estimate the likelihood of each particle based off of the posterior distribution of the current state given the state at the previous time step, $P(p^i_k | p^i_{k-1})$, and the current predicted posterior distribution of the observation given the state, $P(v_k | p^i_k)$. The weights for each particle can be calculated using (21) in Example 1.

The weights in (21) need to be normalized when used in the importance sampling. The normalization of the weights is calculated by:

$$\hat{w}^j_k = \frac{w^j_k}{\sum_{j=1}^{N} w^j_k} \quad (27)$$

where N is the number of samples in the particle cloud. The weights are used to estimate the posterior distribution of the estimated position and velocity. The weights are also used to determine if the particle filter has an effective number of meaningful particles remaining. The effective number of particles is calculated by (28) given by:

$$N_{effective} = \frac{1}{\sum_{i=1}^{N}(w_k^i)^2} \quad (28)$$

If the effective number of particles is less than a set threshold $N_{th}$, then the particle cloud must be resampled. Lastly, the posterior particles for position and velocity are drawn from the posterior distribution of position and velocity, respectively. Particle filters can degenerate as particle weights can diminish to zero. In order to mitigate this issue, the concept of resampling is used, which ensures that the particle filter has enough particles to progress to the next state.

The particle filter is broken down into multiple steps. The first step initializes a particle cloud with an expected value equal to the initial position of the platform. The second step moves the point cloud by the motion model of the system described by (25). The third step resamples the values in the point cloud, and the last step produces the position estimate by calculating the expected value of the resampled point cloud. The resampling step is required to remove samples in the point cloud that are least likely to be the true position, while maintaining the number of particles in the point cloud. Removing samples with the least likelihood of being the true position allows for the particle filter to converge to the true position. If the resampling technique is not effectively implemented, the particle cloud could degenerate, meaning the particle cloud will produce erroneous predictions.

Particle filters allow for a distribution to be proposed in solving for position estimation. Assuming the samples within the particle cloud are independent, the expected value of the particle cloud will be an unbiased estimate of position. Furthermore, the law of large numbers shows that the position estimates from the particle filter will converge to the true position. Using particle filters, the posterior position estimate can be calculated using (22) in Example 1. If the system cannot be modeled with Gaussian distributions, the particle filter (22) is modified to utilize a weighted sum as shown by (23) in Example 1.

II. Methods

Figure 10:
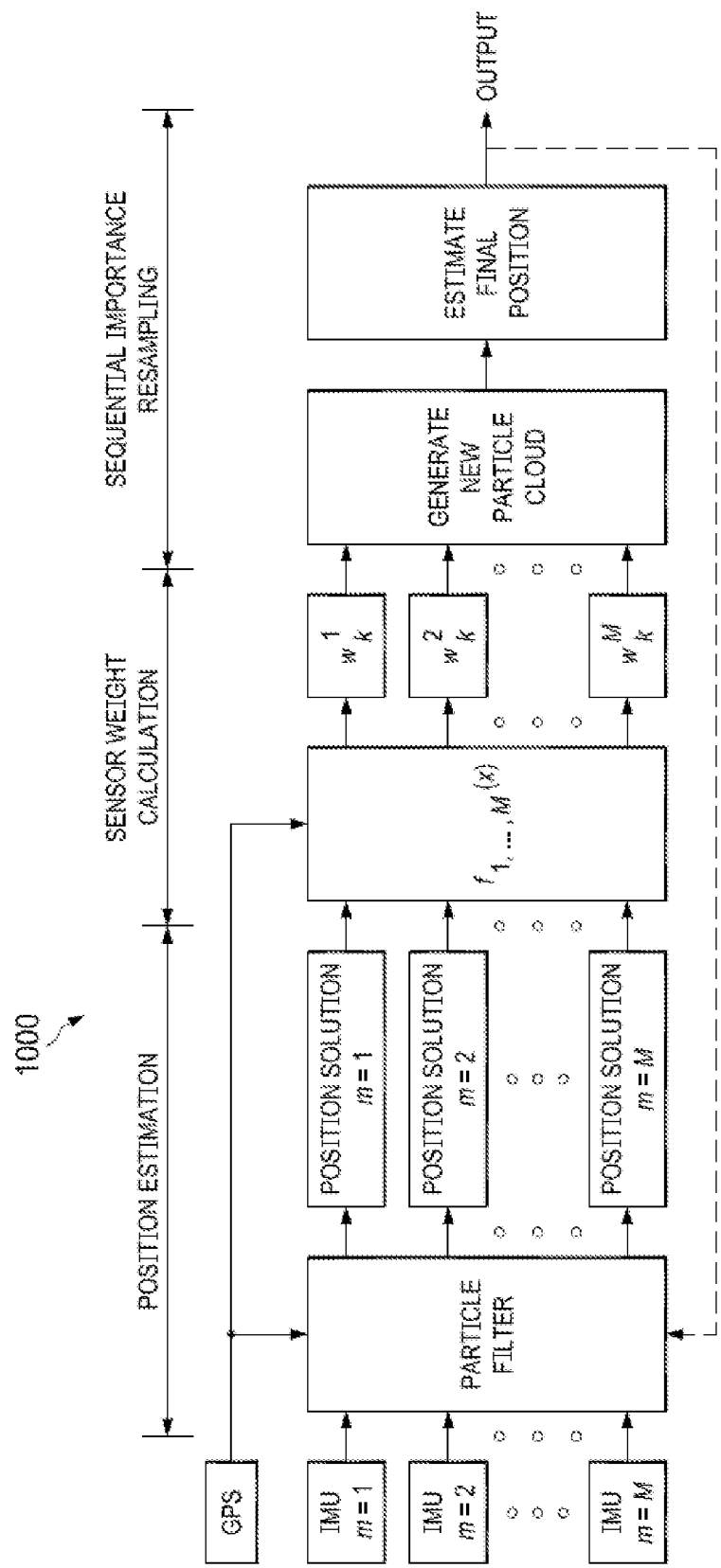
FIG. 10 is a block diagram of the disclosed algorithm. To begin, GPS measurements are fed to each sensor particle filter and the sequential importance resampling technique.

The methods used in this example focus on fusing the particle clouds from multiple particle filters, each propagated from different sensor measurements. The disclosed method uses sequential importance sampling principles and the performance is evaluated based on the RMSE. The disclosed method is compared to the traditional method of combining measurements, such as taking the mean of the particle filter estimations. A block diagram of the algorithm is shown in FIG. 10.

The disclosed method is inspired by the SIR principle, by which weights are assigned to each of the particles. The weights are then used to resample a set of new particles comprised of more highly weighted particles. The disclosed method applies the same methodology by assigning weights to the outcomes of each sensor estimation. The weighted estimations are then used as the proposal distribution for a new particle filter, which then draws a set of particles from the proposal distribution according to the weighted sensor estimations. A new estimate is then calculated by taking the expected value of the new particle cloud. In this method, the weights are calculated using (21). The new particle cloud collects a number of samples from the weights and the respective sensor estimation is used as part of the new particle cloud. By doing so, the sensor with the highest weight is selected more often during the creation of the new particle cloud.

The pseudo code for the implemented algorithm is illustrated as Algorithm 1 (FIG. 11). The algorithm first resolves each of the sensor measurements using a particle filter. The results of each of the particle filters are then fused together. The method used to fuse each sensor output together is based on the resample step in particle filtering. The method assigns a weight to each sensor measurement. The sensor weights are calculated based on the likelihood of the position solution compared to a GPS solution. The sensor weights are then used to produce a number of samples according to the weighted sensor outputs. The expected values of the samples are then used to be the final position estimate for the navigating body.

The amount of accuracy gained by each additional sensor can be estimated using the CRLB calculated using (29).

$$CRLB = \frac{1}{-E\left(\frac{d^2\ln(p(x;\mu))}{d\mu}\right)\bigg|_{\mu=true}} \quad (29)$$

Assuming the distribution of the sensor solutions is Gaussian with the expected value being truth, the CRLB can be simplified such that the maximum accuracy of fusing multiple sensors is equal to the standard deviation divided by the number of sensor solutions provided, as calculated by (30).

$$\text{Var}\{\hat{\mu}\} \geq \frac{\sigma^2}{N} \quad (30)$$

The standard deviation of the positional solution can be viewed as the errors in the position estimates from the IMUs. In this case, the positional errors are caused by integrating the errors from the accelerometers, the initialization error in velocity, and the initial position error, calculated by (31).

$$P_e(t) = \int\int_{\tau=0}^{t} a_e(\tau)d\tau d\tau + \int_{\tau=0}^{t} v_e(0)d\tau + P_e(0) \quad (31)$$

The errors in the acceleration measurement from the IMUs can be calculated by accounting for the errors in measured acceleration, the errors in rotating the measured accelerations to the right coordinate frame, and the errors in the gravity and earth rotation models. In (32), $R_r(t)a'_e(t)$ is the error in the measure acceleration. To represent misalignment, $R'_e(t)(a'_r(t)-a'_g(t)-a'_r(t))+R_e$ is the error caused by rotating the true accelerations, gravity, and earth rotation to the desired coordinate frame. Lastly, the errors in rotating the estimated earth rotation rate $R_e(t)a'_r(t)$ and estimated gravity $R'_e(t)a'_g(t)$ are all combined to estimate acceleration errors.

$$a_e(t) = R_r(t)a'_e(t) + R'_e(t)(a'_r(t) - a'_g(t) - a'_r(t)) + R_e(t)a'_r(t) + R'_e(t)a'_g(t) \quad (32)$$

The error effects from the IMU can be estimated from the specification provided by the manufacturer of the sensors. In (33), the scale factor errors at a given acceleration $B(a_r)$ are combined with the misalignment $\theta_m$ and non-orthogonality $\theta_n$. In addition, bias instability b white noise N, and random walk $$RW(f) = \frac{K^2}{(2*\pi*f)^2}$$

are also contributing factors to errors from the IMU.

$$a'_e(t) = B(a_t) + \sin(\theta_m + \theta_n) + b + N^2 + \frac{K^2}{(2*\pi*f)^2} \quad (33)$$

Lastly, the IMU errors can be used with the true acceleration $a_t$, and the duration T, in which the acceleration was experienced to calculate the positional standard deviation calculated by (34).

$$\sigma^2 = a_t\left(\frac{T^2}{2}\right)a'_e(t) \quad (34)$$

III. Simulation

Figure 12:
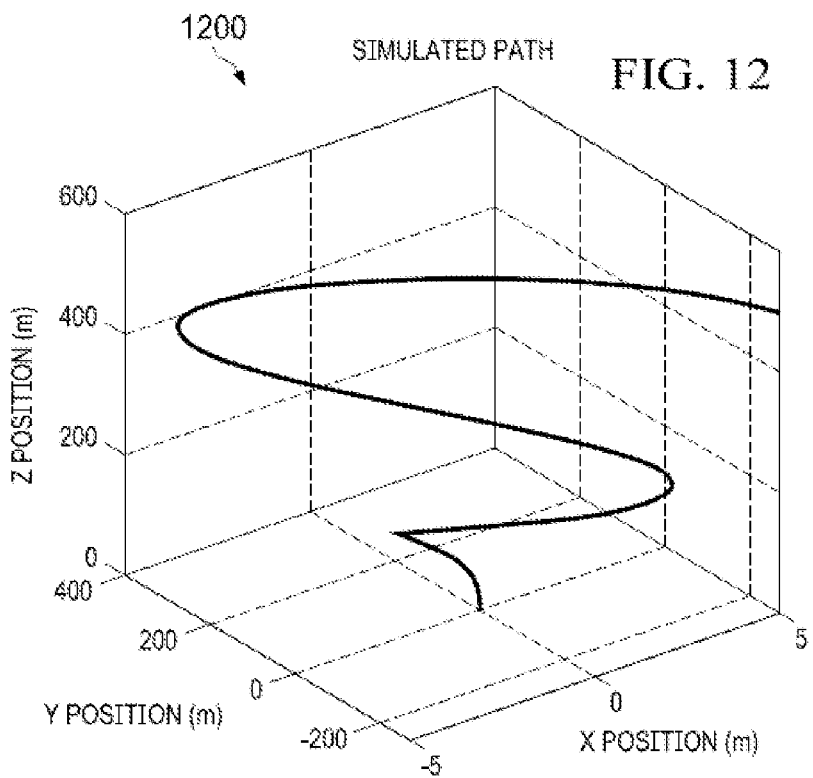
FIG. 12 shows a simulated path of a navigating body. The acceleration values were calculated by calculating velocity in x, y, and z, and then calculating acceleration.
Figure 13:
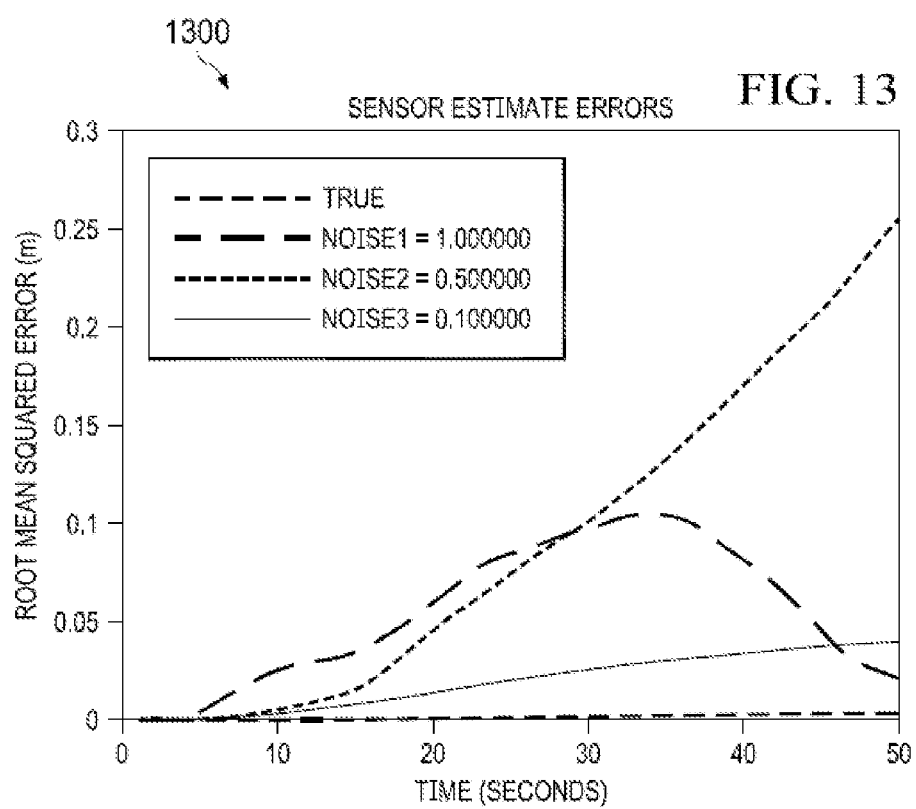
FIG. 13 shows noisy sensor estimate errors (RMSEs). The bottom-most line represents the output of the particle filter being fed with true sensor measurements. The other lines represent the output of the same particle filter being fed with noisy sensor measurements with different noise variations.

Two three-dimensional paths of a navigating body were simulated. The first simulated path is calculated using (35):

$$\begin{bmatrix} x \\ y \\ z \end{bmatrix} = \begin{bmatrix} \frac{1}{10}t\cos\left(\frac{1}{4}t\right) \\ 10t\sin\left(\frac{1}{5}t\right) \\ 10t \end{bmatrix} \quad (35)$$

and is shown in FIG. 12. The sensor measurements of the path are then simulated by corrupting the position with three different sets of randomly-generated Gaussian noise with standard deviations shown in Table 2. The error of each simulated sensor is shown in FIG. 13. The error portrayed in FIG. 13 represents the error in position estimates of each sensor after using a particle filter.

TABLE 2

Noise standard deviation values for three different simulated sensors

| Sensor Number | Noise Standard Deviation (m) |
|---|---|
| 1 | 0.50 |
| 2 | 1.00 |
| 3 | 0.10 |

The second path was simulated using three IMUs integrated with a GPS solution. The IMU parameters to simulate the scenario are derived from the Analog Devices ADIS16465 precision IMU. The parameters of the IMU are specified in Table 3.

TABLE 3

Analog Devices ADIS16465 Specifications

| Parameter | Value |
|---|---|
| Gyro Bias | 0 deg/$\sqrt{hr}$ |
| Gyro Angle Random Walk | 0.15 deg/$\sqrt{hr}$ |
| Gyro Bias Stability | 2.0 deg/hr |
| Accelerometer Bias | 0.0 m/s$^2$ |
| Accelerometer Velocity Random Walk | 0.012 m/s/$\sqrt{hr}$ |
| Accelerometer Bias Stability | 3.6e$^{-3}$ m/s$^2$ |

Figure 14:
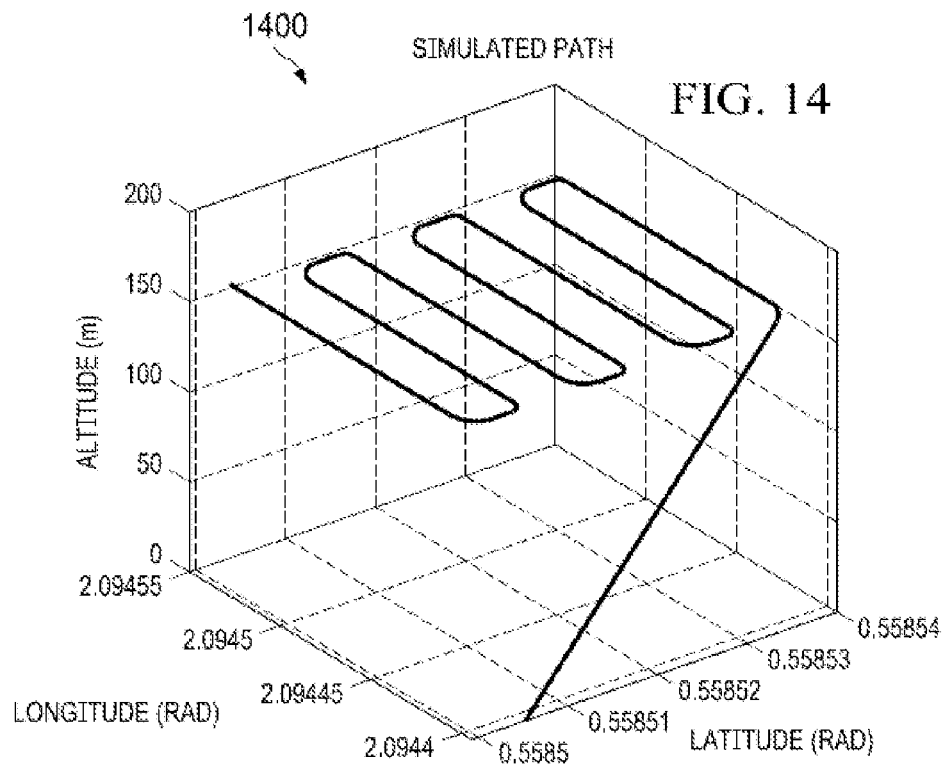
FIG. 14 shows a simulated path for three IMU scenarios. The path was generated using Acienna's GNSS-INS-sim python library.
Figure 15:
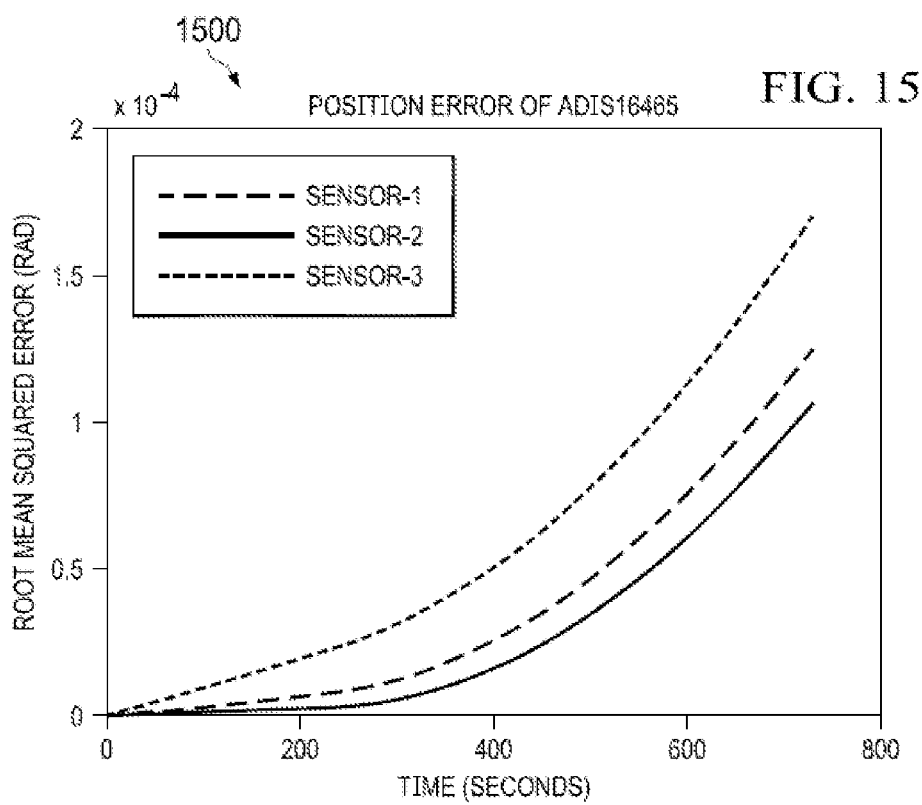
FIG. 15 shows RMSEs of three ADIS16465 sensor simulations.
Figure 16:
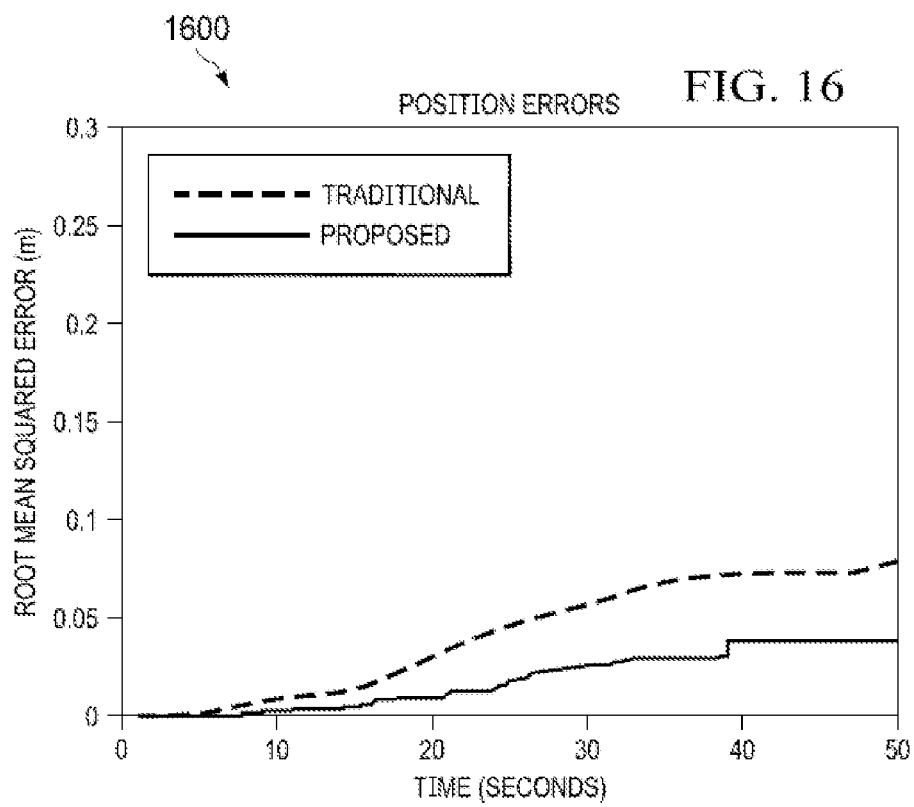
FIG. 16 shows RMSEs of both algorithms calculated using (30). The upper line is the traditional method of taking the mean, and the lower line shows the results for the disclosed method.
Figure 17:
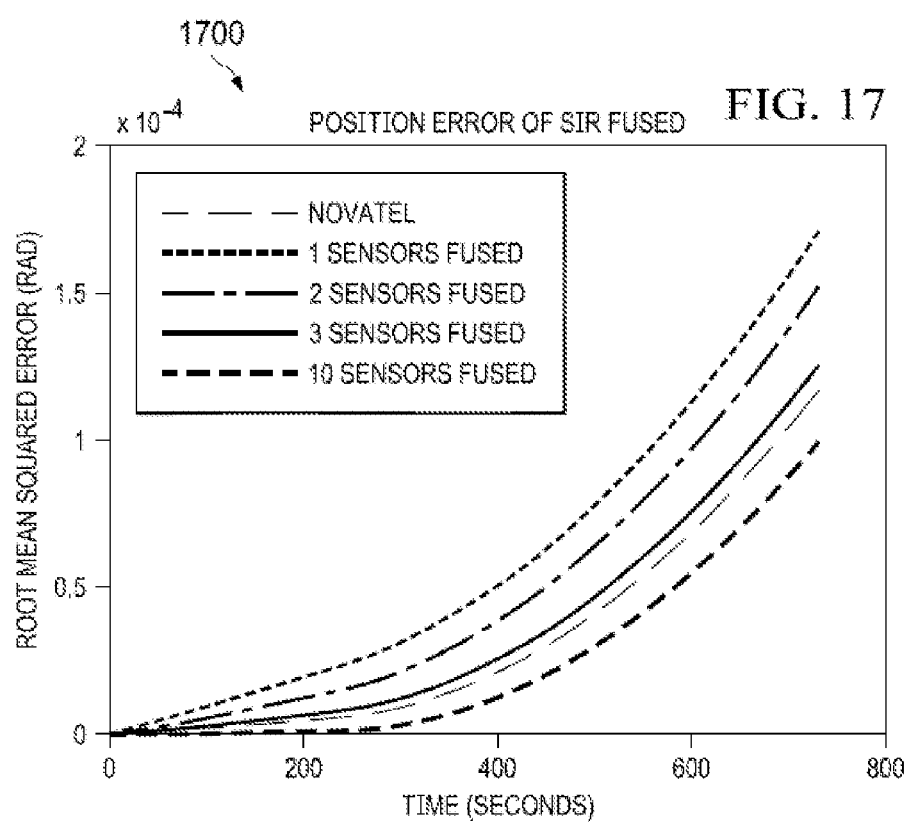
FIG. 17 shows RMSE of a NovAtel unit compared to ADIS16465 IMUs calculated using function (16). The blue line represents the NovAtel unit, and the red line represents 1 ADIS16465 position solution. The yellow line and purple line represent 2 and 3 ADIS16465 IMUs fused together using the proposed method. Lastly, the green line is 10 ADIS15465 IMUs fused together using the proposed method.

Each IMU measurement was transformed into the local navigation frame (NED) using measured gyro angular rotation rates. In addition, acceleration values from the IMUs were used to resolve the velocity of the body in the local navigation frame. The velocity was then used to update position in geodetic coordinates (latitude, longitude, and altitude). The simulated path utilized three IMUs with the same noise and biasing characteristics. A picture of the simulated path is shown in FIG. 14. The errors in the positions estimated from each sensor independently are shown in FIG. 15. The positions are resolved using a particle filter fused with simulated GPS measurements.

These sets of measurements are then used as inputs into their own particle filters and fused with GPS. These particle filter results are traditionally how sensor measurements are fused. Next, each traditional particle filter result is fused using the disclosed algorithm and compared to the truth positions. The RMSE is used as the metric for determining accuracy of the final result. The RMSE is calculated using (36):

$$RMSE = \sqrt{\frac{1}{N}\sum_{i=1}^{N}(x_i(k) - x_t(k))^2}, \quad (36)$$

where $x_i(k)$ are the particles at state k and $x_t(k)$ is the simulated true path with no noise corruption at state k. The simulation fuses the sensor measurements with a GPS solution using a traditional implementation of a particle filter. The simulation then applies the disclosed algorithm to combine the estimations from the different sensors.

IV. Results

Figure 18:
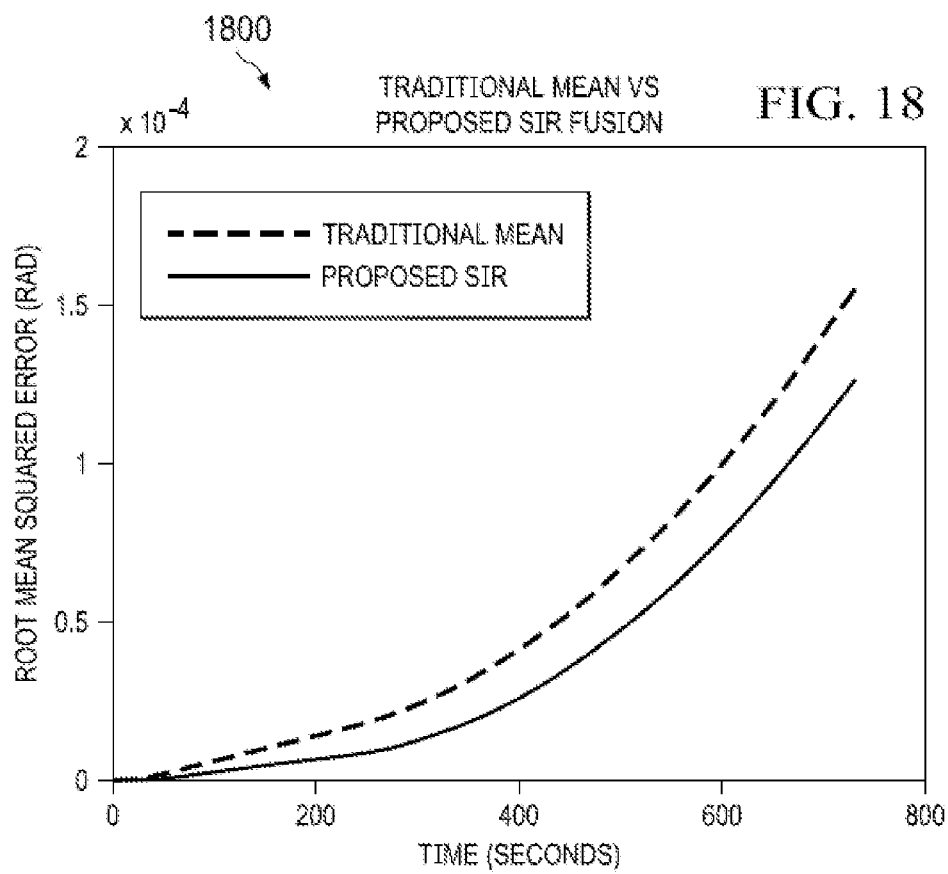
FIG. 18 shows RMSEs of three IMU scenarios calculated using (30). The upper line represents the traditional method of taking the mean, and the lower line shows the results for the disclosed method.

The RMSE of the traditional method and disclosed method are shown in FIG. 18 for the first simulated path in FIG. 12. In addition, the RMSEs of the three ADIS16465 IMU scenarios are also displayed in FIG. 15. The disclosed method provided better estimated results that are approximately three times more accurate than the traditional method. The RMSE was calculated between the disclosed method and the traditional method to highlight the performance differences of each method. By combining the predictions of each sensor, using the disclosed method as seen by FIG. 10 and algorithm 1 (FIG. 11), the final estimations are more accurate than traditionally taking the average.

The disclosed method of multi-IMU sensor fusion based on SIR is an improvement over the traditional particle filter method. The disclosed method can be used to fuse multiple estimations of position together. The different position estimates can be weighted, and the disclosed method can be applied to get more accurate position results. The position estimates of the navigating body can be estimated from sensors with both different and identical error parameters. Two distinctly different flight paths are simulated using one of the error parameter models, both resulting in better position estimation, illustrating the advantages and generality of the disclosed method. The algorithm disclosed herein allows for position measurements of various qualities to be fused to obtain a more favorable result.

Dithering Techniques

The techniques disclosed rely on the statistical independence of each IMU measurement. In order to increase the statistical independence of the samples, techniques to dither the samples, or intentionally apply noise to randomize error, can be explored. Dithering is the act of purposefully injecting error into the system to counteract or reverse the effects of the errors caused by the sensors. The disclosed method of fusing multiple IMU measurements enables multiple dithering techniques. A temporal dithering technique is sought whereby each IMU sensor is configured to sample at different moments in time from each other. These differences in time introduce an aspect of randomness that further de-correlates the IMU measurements. The temporal dithering technique can be implemented by staggering the data capture start time of each IMU during the initiation sequence. The staggered start introduces the dithering in time needed to further de-correlate the samples. Spatial dithering is another dithering technique that can further increase independence of each sample. This method is accomplished by offsetting the location of each IMU in three-dimensional space. Each axis of the IMU can be used to offset the measurements produced by the IMU. This offsets create a bias that when combined with the inherent noise of the sensor introduces the dither required for improving sample independence. Another way of dithering spatially is by offsetting the orientation of the IMUs. In this method, the orientation can be utilized to counteract similar sensor biases by orienting the sensor in such a way that the biases of each sensor cancel each other's effects. Lastly, introducing a different sensor with characteristics that can counteract the errors produced by another sensor can also be used to dither the measurements produced by a system of IMUs. This method allows for different grade sensors to be combined in order to purposely introduce error that further increases sample independence.

Implementation Examples

The disclosed technique is inherently a process or algorithm specifically targeted towards the fusion of multiple IMUs. The algorithm can be implemented in a multitude of ways including on embedded systems, real-time systems, and distributed systems. Embedded system can be designed such that an embedded computing unit with the appropriate amount of resources can utilize the method disclosed. These embedded systems could use an FPGA capable of implementing the steps required by the disclosed method. In addition, the algorithm can be implemented on a GPU that has the required resources for the algorithm. In real-time systems, the algorithm can be implemented where each time epoch required for the system is calculated as the sensor measurements arrive. This method does not necessarily require saving the IMU measurements, which can be useful when storage resources are limited. Lastly, a distributed system is an implementation technique where multiple systems calculate the position from each IMU. The outputs of each system are then outputted into a final system to calculate the final position. This implementation allows for sensor networks to estimate positions.

Figure 19:
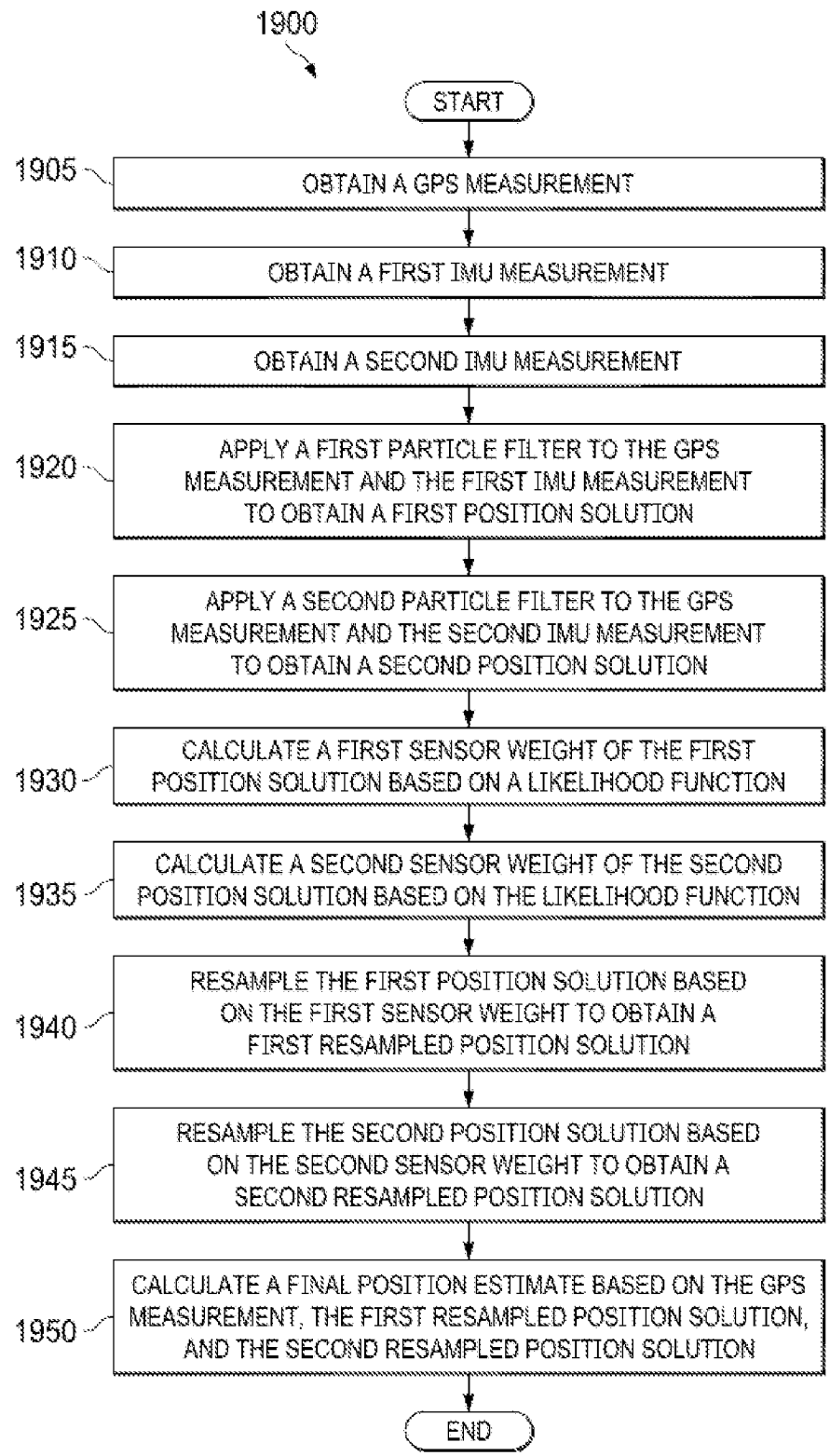
FIG. 19 is a flowchart illustrating a method of position estimation according to an embodiment of the disclosure.

FIG. 19 is a flowchart illustrating a method 1900 of position estimation according to an embodiment of the disclosure. At step 1905, a GPS measurement is obtained. At step 1910, a first IMU measurement is obtained. At step 1915, a second IMU measurement is obtained. At step 1920, a first particle filter is applied to the GPS measurement and the first IMU measurement to obtain a first position solution. At step 1925, a second particle filter is applied to the GPS measurement and the second IMU measurement to obtain a second position solution. At step 1930, a first sensor weight of the first position solution is calculated based on a likelihood function. At step 1935, a second sensor weight of the second position solution is calculated based on the likelihood function. At step 1940, the first position solution is resampled based on the first sensor weight to obtain a first resampled position solution. At step 1945, the second position solution is resampled based on the second sensor weight to obtain a second resampled position solution. The first position solution and the second position solution may be resampled at a rate between about 1 kHz and about 4 kHz. Finally, at step 1950, a final position estimate is calculated based on the GPS measurement, the first resampled position solution, and the second resampled position solution.

A GPS device that provides the GPS measurement, a first IMU that provides the first IMU measurement, a second IMU that provides the second IMU measurement, and a device that performs steps 1905-1950 may be separate devices or combined into a single device or multiple devices. In addition, multiple devices may perform steps 1905-1950 in a networked manner. In an alternative, the first position solution and the second position solution are not resampled. Rather, a new sample set is selected by drawing N values randomly from the first position solution and the second position solution.

Figure 20:
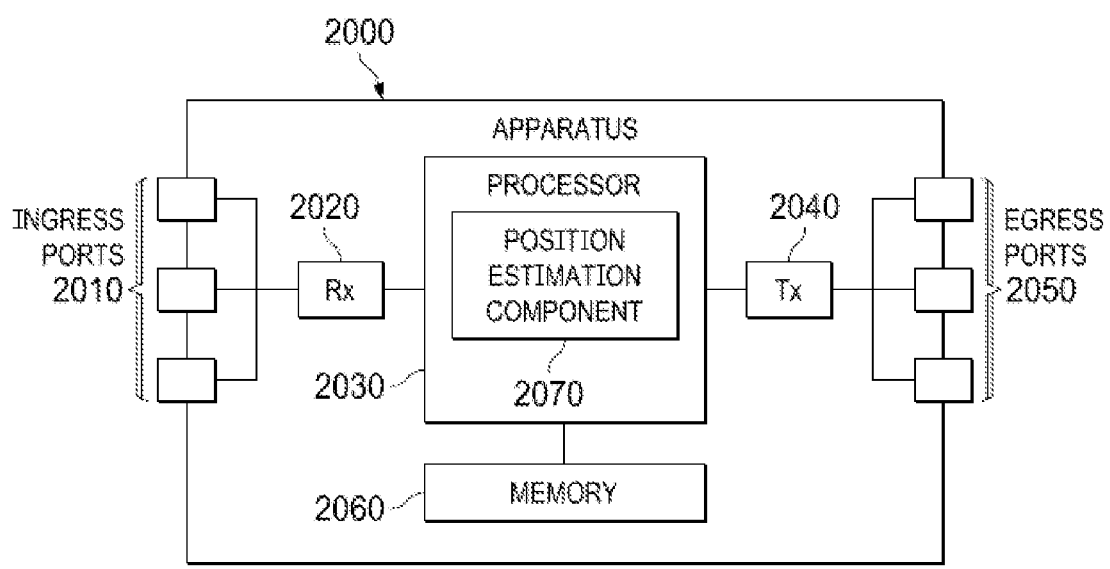
FIG. 20 is a schematic diagram of an apparatus according to an embodiment of the disclosure.

FIG. 20 is a schematic diagram of an apparatus 2000 according to an embodiment of the disclosure. The apparatus 2000 may implement the disclosed embodiments. The apparatus 2000 comprises ingress ports 2010 and an RX 2020 to receive data; a processor, logic unit, baseband unit, or CPU 2030 to process the data; a TX 2040 and egress ports 2050 to transmit the data; and a memory 2060 to store the data. The apparatus 2000 may also comprise OE components, EO components, or RF components coupled to the ingress ports 2010, the RX 2020, the TX 2040, and the egress ports 2050 to provide ingress or egress of optical signals, electrical signals, or RF signals.

The processor 2030 is any combination of hardware, middleware, firmware, or software. The processor 2030 comprises any combination of one or more CPU chips, cores, FPGAs, ASICs, or DSPs. The processor 2030 communicates with the ingress ports 2010, the RX 2020, the TX 2040, the egress ports 2050, and the memory 2060. The processor 2030 comprises a position estimation component 2070, which implements the disclosed embodiments. The inclusion of the position estimation component 2070 therefore provides a substantial improvement to the functionality of the apparatus 2000 and effects a transformation of the apparatus 2000 to a different state. Alternatively, the memory 2060 stores the position estimation component 2070 as instructions, and the processor 2030 executes those instructions.

The memory 2060 comprises any combination of disks, tape drives, or solid-state drives. The apparatus 2000 may use the memory 2060 as an over-flow data storage device to store programs when the apparatus 2000 selects those programs for execution and to store instructions and data that the apparatus 2000 reads during execution of those programs, for instance as a computer program product. The memory 2060 may be volatile or non-volatile and may be any combination of ROM, RAM, TCAM, or SRAM.

A computer program product may comprise computer-executable instructions stored on a non-transitory medium, for instance the memory 2060, that when executed by a processor, for instance the processor 2030, cause an apparatus to perform any of the embodiments.

While several embodiments have been provided in the present disclosure, it will be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope of the inventive concepts disclosed herein.

What is claimed is:

1. A method comprising:
   obtaining a Global Positioning System (GPS) measurement;
   obtaining a first inertial measurement unit (IMU) measurement;
   obtaining a second IMU measurement;
   applying a first particle filter to the GPS measurement and the first IMU measurement to obtain a first position solution;
   applying a second particle filter to the GPS measurement and the second IMU measurement to obtain a second position solution;
   calculating a first sensor weight of the first position solution based on a likelihood function;
   calculating a second sensor weight of the second position solution based on the likelihood function;
   resampling the first position solution based on a sum of the first sensor weight and the second sensor weight to obtain a first resampled position solution;
   resampling the second position solution based on the second sensor weight to obtain a second resampled position solution; and
   calculating a final position estimate based on the GPS measurement, the first resampled position solution, and the second resampled position solution.

2. The method of claim 1, wherein the first particle filter is based on a first probability distribution function (PDF), and wherein the second particle filter is based on a second PDF.

3. The method of claim 1, wherein the likelihood function determines a first likelihood of the first position solution compared to the GPS measurement and a second likelihood of the second position solution compared to the GPS measurement.

4. The method of claim 1, wherein calculating the first sensor weight comprises calculating the first sensor weight based on a probability density function (PDF).

5. The method of claim 4, wherein calculating the second sensor weight comprises calculating the second sensor weight based on the PDF.

6. The method of claim 1, wherein resampling the second position solution comprises resampling the second position solution based on the sum.

7. The method of claim 1, wherein resampling the first position solution and the second position solution comprises resampling the first position solution and the second position solution at a rate between about 1 kilohertz (kHz) and about 4 kHz.

8. An apparatus comprising:
   a memory; and
   a processor coupled to the memory and configured to:
      obtain a Global Positioning System (GPS) measurement;
      obtain a first inertial measurement unit (IMU) measurement;
      obtain a second IMU measurement;
      apply a first particle filter to the GPS measurement and the first IMU measurement to obtain a first position solution;
      apply a second particle filter to the GPS measurement and the second IMU measurement to obtain a second position solution;
      calculate a first sensor weight of the first position solution based on a likelihood function;
      calculate a second sensor weight of the second position solution based on the likelihood function;
      resample the first position solution based on a sum of the first sensor weight and the second sensor weight to obtain a first resampled position solution;
      resample the second position solution based on the second sensor weight to obtain a second resampled position solution; and
      calculate a final position estimate based on the GPS measurement, the first resampled position solution, and the second resampled position solution.

9. The apparatus of claim 8, wherein the first particle filter is based on a first probability distribution function (PDF), and wherein the second particle filter is based on a second PDF.

10. The apparatus of claim 8, wherein the likelihood function determines a first likelihood of the first position solution compared to the GPS measurement and a second likelihood of the second position solution compared to the GPS measurement.

11. The apparatus of claim 8, wherein the processor is further configured to calculate the first sensor weight based on a probability density function (PDF).

12. The apparatus of claim 11, wherein the processor is further configured to calculate the second sensor weight based on the PDF.

13. The apparatus of claim 8, wherein the processor is further configured to resample the second position solution based on the sum.

14. The apparatus of claim 8, wherein the processor is further configured to resample the first position solution and the second position solution at a rate between about 1 kilohertz (kHz) and about 4 kHz.

15. A computer program product comprising instructions that are stored on a non-transitory medium and that, when executed by a processor, cause an apparatus to:

obtain a Global Positioning System (GPS) measurement;
obtain a first inertial measurement unit (IMU) measurement;
obtain a second IMU measurement;
apply a first particle filter to the GPS measurement and the first IMU measurement to obtain a first position solution;
apply a second particle filter to the GPS measurement and the second IMU measurement to obtain a second position solution;
calculate a first sensor weight of the first position solution based on a likelihood function;
calculate a second sensor weight of the second position solution based on the likelihood function;
resample the first position solution based on a sum of the first sensor weight and the second sensor weight to obtain a first resampled position solution;
resample the second position solution based on the second sensor weight to obtain a second resampled position solution; and
calculate a final position estimate based on the GPS measurement, the first resampled position solution, and the second resampled position solution.

16. The computer program product of claim 15, wherein the likelihood function determines a first likelihood of the first position solution compared to the GPS measurement and a second likelihood of the second position solution compared to the GPS measurement.

17. The computer program product of claim 15, wherein the instructions, when executed by the processor, further cause the apparatus to resample the second position solution based on the sum.

18. The computer program product of claim 15, wherein the first particle filter is based on a first probability distribution function (PDF), and wherein the second particle filter is based on a second PDF.

19. The computer program product of claim 15, wherein the instructions, when executed by the processor, further cause the apparatus to calculate the first sensor weight based on a probability density function (PDF).

20. The computer program product of claim 19, wherein the instructions, when executed by the processor, further cause the apparatus to calculate the second sensor weight based on the PDF.

* * * * *